(12) United States Patent
Mohamed et al.

(10) Patent No.: US 7,698,361 B2
(45) Date of Patent: Apr. 13, 2010

(54) LIGHTWEIGHT INPUT/OUTPUT PROTOCOL

(75) Inventors: Ahmed H. Mohamed, Sammamish, WA (US); Anthony F. Voellm, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1284 days.

(21) Appl. No.: 10/749,959

(22) Filed: Dec. 31, 2003

(65) Prior Publication Data

US 2005/0198113 A1  Sep. 8, 2005

(51) Int. Cl.
  *G06F 15/16* (2006.01)
(52) U.S. Cl. .................. 709/203; 709/201; 709/211; 709/217; 707/10; 711/211
(58) Field of Classification Search ............... 709/211, 709/217, 201, 203, 212, 213, 216, 219; 707/10; 711/211
See application file for complete search history.

(56) References Cited

U.S. PATENT DOCUMENTS

| | | | | |
|---|---|---|---|---|
| 5,499,371 | A * | 3/1996 | Henninger et al. | 717/108 |
| 6,832,297 | B2 * | 12/2004 | Pfister et al. | 711/144 |
| 6,976,174 | B2 * | 12/2005 | Terrell et al. | 726/22 |
| 7,103,626 | B1 * | 9/2006 | Recio et al. | 709/201 |
| 2002/0091852 | A1 * | 7/2002 | Frazier et al. | 709/232 |
| 2004/0003069 | A1 * | 1/2004 | Wong | 709/223 |
| 2004/0010545 | A1 * | 1/2004 | Pandya | 709/203 |
| 2004/0010612 | A1 * | 1/2004 | Pandya | 709/230 |
| 2004/0030806 | A1 * | 2/2004 | Pandya | 709/250 |
| 2004/0030822 | A1 * | 2/2004 | Rajan et al. | 711/4 |
| 2004/0117438 | A1 * | 6/2004 | Considine et al. | 709/203 |

FOREIGN PATENT DOCUMENTS

| | | |
|---|---|---|
| WO | WO 03/104943 A2 | 12/2003 |
| WO | WO 02/46866 A2 | 6/2006 |

OTHER PUBLICATIONS

Kleiman, Steve and Jeffrey Katcher. An Introduction to the Direct Access File System. Network Appliance White Paper. Jun. 20, 2000. Available at <http://www.dafscollaborative.org/press/dafs_whitepaper.shtml>.
Carter, Jeffrey et al. DAFS—Enabling Data Center Applications. DAFS Collaborative White Paper. Dec. 2000. Available at <http://www.dafscollaborative.org/press/articles/datacenter.pdf>.

(Continued)

*Primary Examiner*—Saleh Najjar
*Assistant Examiner*—Thuong T Nguyen
(74) *Attorney, Agent, or Firm*—Merchant & Gould P.C.

(57) ABSTRACT

A method and system for offloading I/O processing from a first computer to a second computer, using RDMA-capable network interconnects, are disclosed. The method and system include a client on the first computer communicating over an RDMA connection to a server on the second computer by way of a lightweight input/output (LWIO) protocol. The protocol generally comprises a network discovery phase followed by an I/O processing phase. During the discovery phase, the client and server determine a minimal list of shared RDMA-capable providers. During the I/O processing phase, the client posts I/O requests for offloading to the second machine over a mutually-authenticated RDMA channel. The I/O model is asymmetric, with read operations being implemented using RDMA and write operations being implemented using normal sends. Read and write requests may be completed in polling mode and in interrupt mode. Buffers are managed by way of a credit mechanism.

21 Claims, 23 Drawing Sheets

AUTHENTICATE

OTHER PUBLICATIONS

Kleiman, Steven. DAFS File Access Protocol Improvements over NFSv4, DAFS Collaborative White Paper. Jan. 12, 2001. Available at <http://www.dafscollaborative.org/press/pdf/improve.pdf>.

PCT International Search Report, mailed Mar. 3, 2008.
PCT Written Opinion, mailed Mar. 3, 2008.

* cited by examiner

SERVER REQUEST RESUME KEY

NEGOTIATE REQUEST

AUTHENTICATE RESPONSE

SERVER AUTHENTICATE COMPLETION

REGISTER FILE

SERVER REGISTER FILE COMPLETION

INTERRUPT REQUEST

SERVER INTERRUPT COMPLETION

SERVER-TO-CLIENT CREDIT MESSAGE

CLIENT-TO-SERVER CREDIT MESSAGE

SERVER CREDIT COMPLETION

CLIENT CLOSE MESSAGE

SERVER CLOSE COMPLETION

CLIENT CANCEL MESSAGE

SERVER CANCEL COMPLETION

CLIENT READ MESSAGE (NO POLLING)

READ COMPLETION (NO POLLING)

CLIENT READ MESSAGE (POLLING)

READ COMPLETION (POLLING)

CLIENT WRITE MESSAGE (NO POLLING)

WRITE COMPLETION (NO POLLING)

CLIENT WRITE MESSAGE (POLLING)

WRITE COMPLETION (POLLING)

CLIENT VECREAD MESSAGE (NO POLLING)

VECREAD COMPLETION (NO POLLING)

CLIENT VECREAD MESSAGE (POLLING)

VECREAD COMPLETION (POLLING)

CLIENT VECWRITE MESSAGE, NOT COLLAPSED (NO POLLING)

CLIENT VECWRITE MESSAGE, COLLAPSED (NO POLLING)

CLIENT VECWRITE MESSAGE, COLLAPSED (POLLING)

CLIENT VECWRITE COMPLETION (NO POLLING)

CLIENT VECWRITE COMPLETION (POLLING)

LIGHTWEIGHT INPUT/OUTPUT PROTOCOL

TECHNICAL FIELD

The present invention relates generally to systems and methods of remote file access, and more particularly to techniques for offloading input/output processing using Remote Direct Memory Access (RDMA).

BACKGROUND

In computing environments it is generally desirable to conserve scarce CPU resources. For some such environments, such as networks of application server nodes, such conservation is especially critical. As networks become faster, they make greater demands on CPUs to process packets and perform I/O operations, resulting in slower application performance. This is particularly detrimental for inherently I/O-intensive applications like databases.

One approach to remedying this problem is to offload excessive I/O and network processing from the CPU. In a networked environment, using distributed file systems and transport protocols like NFS or SMB/CIFS, it is possible to send I/O requests from a local machine to a remote machine. However, it is not necessarily the case that the local machine will achieve significant processing economies using such approaches.

In the single machine context, I/O processing burdens can be alleviated by offloading I/O tasks to a direct memory access (DMA) controller. Remote Direct Memory Access (RDMA) technology is a more recently-developed extension of DMA for multiple networked computers. RDMA allows data to be moved between memory buffers on two communicating machines equipped with RDMA-capable network interface cards (NICs) without having to involve the CPU and operating system of either the source or the destination machine. RDMA can be used to offload I/O processing to a remote machine, thereby enabling the local machine to reclaim CPU cycles for applications. RDMA has been exploited in high-speed, high-bandwidth interconnect technologies, such as the Virtual Interface Architecture (VIA), InfiniBand, and iWarp. These interconnects are particularly designed for high-reliability network connections between clusters of server nodes within a data center or other local file-sharing environment.

Protocols defining the communication between a local offloading node and a remote machine must be designed in order for the capabilities associated with RDMA technology to be fully utilized and their benefits effectively achieved. Therefore, there is a need for the lightweight input/output (LWIO) protocol of the present invention.

SUMMARY OF THE INVENTION

In accordance with one aspect of the present invention, a system for offloading an I/O task from a first computer to a second computer is provided. The system includes a client running on the first computer and a server running on the second computer. The system further includes one or more RDMA channels linking the first computer and the second computer. The client and server communicate in accordance with an LWIO protocol comprising a network discovery phase and an I/O processing phase. The LWIO protocol is used in association with another network protocol, such as SMB/CIFS, leveraging the security and authentication infrastructure of the second protocol. In order to provide a better security model, the I/O model in the protocol is asymmetric: reads are implemented using RDMA, while writes are implemented using send operations.

In accordance with another aspect of the present invention, a method for offloading an I/O task from a first computer to a second computer is provided. The method takes advantage of common RDMA-capable communication devices on the two computers and is associated with a lightweight input/output (LWIO) client-server protocol. The protocol generally comprises a discovery phase followed by an I/O processing phase. During the discovery phase, the client and server determine a minimal list of shared RDMA-capable providers. During the I/O processing phase, the client posts I/O requests for offloading to the second machine.

During the discovery phase, the client initially obtains a server request resume key from the server. The client then opens a pipe to the server, over which the client sends a negotiate request containing a list of RDMA-capable providers on the first machine. The server sends a negotiate response over the pipe containing a list of available providers on the second machine that match providers on the first machine. The client then creates an RDMA connection to the server over a shared provider. The client and the server mutually authenticate the new connection. The client then registers one or more files for use with the server.

I/O processing request messages include a close message, a cancel message, a read message, a write message, a vectored read message, and a vectored write message. The protocol features an asymmetric I/O model for security reasons. Read data is sent to the client using RDMA write operations, while writes are completed using ordinary sends. Read and write requests can be specified by the client to be completed by the server in polling mode or in interrupt mode. If the client indicates that the completion should not be in polling mode, the server completes the I/O processing request by sending a status block to the first computer by way of RDMA transfer. If the client indicates that the completion should be in polling mode, the client may request that it be woken up by the server upon completion of the I/O by way of an interrupt request message.

In accordance with another aspect of the present invention, a method for managing buffers in an I/O offload protocol is provided. The method involves the use of a buffer credit mechanism. A server-client credit transaction comprises a three-way handshake initiated and completed by the server. The server sends a delta credit message to the client, including an information field set to a number of credits. If the number is a negative number –N, the client must give up N credits.

Other aspects of the invention include the above-mentioned features embodied on computer-readable media as computer program products and data structures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings, of which:

FIG. 17E is a diagram generally illustrating a representation of an exemplary server I/O status block completing a

DETAILED DESCRIPTION

Certain embodiments of the present invention are discussed below with reference to FIGS. 1-17E. However, those skilled in the art will readily appreciate that the detailed description given herein with respect to these figures is for illustrative purposes, and that the invention extends beyond these embodiments.

Figure 1:
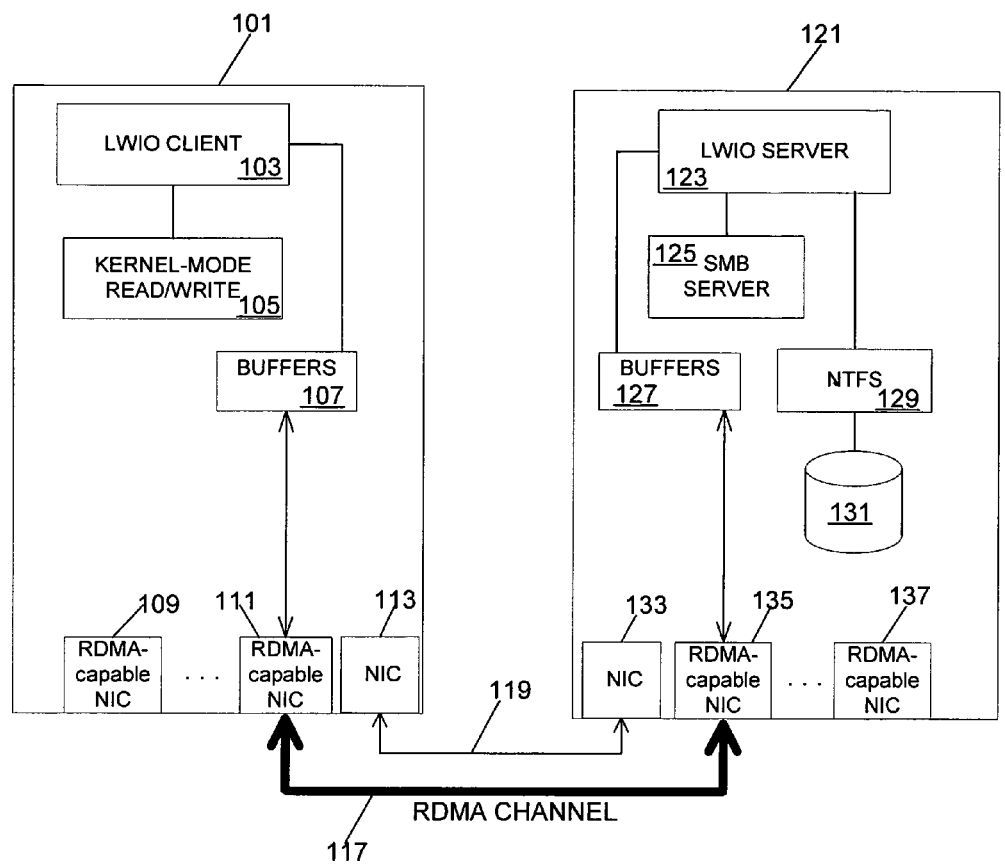
FIG. 1 is a diagram generally illustrating an exemplary client-server computing environment involving two computers capable of communicating by way of RDMA transfer, within which aspects of the present invention can be incorporated.

FIG. 1 is a schematic diagram generally illustrating certain features of a representative networked client/server environment within which aspects of the present invention may be incorporated. Depicted in FIG. 1 are two computer machines, labeled Host A 101 and Host B 121. While the invention may be practiced in an environment involving computers of many different types and uses, in one representative scenario Host A 101 functions as an application server machine charged with I/O-intensive work, such as a database server.

Each of Host A 101 and Host B 121 include a number of network interface cards (NICs) 109, 111, 113, 133, 135, 137 allowing for networked data communication from one machine to the other. Among these NICs are NICs 109, 111, 135, 137 permitting RDMA data transfer. As illustrated, a non-RDMA network link 119 and an RDMA channel 117 are present between the two hosts 101, 121.

Executing on Host A 101 is an LWIO client application 103, associated with an application responsible for processing I/O tasks which interacts with kernel-mode I/O read/write services 105. The LWIO client 103 is used to offload I/O processing from Host A 101 to Host B 121. On Host B 121 an LWIO server 123 is executing. In accordance with the LWIO protocol described herein, the LWIO client 103 communicates with the LWIO server 123. The LWIO client 103 and the LWIO server 123 make use of posted buffers 107, 127, enabling file-associated data to be transferred directly by way of the RDMA channel connection 117. By way of LWIO protocol messages, read and write tasks are offloaded to Host B 121. The server 123 passes on I/O requests to the file system 129, which serves as the interface to the hard disk 131.

Typically, two kinds of messages are associated with an RDMA connection 117. The first type is an ordinary network send/receive, generating an interrupt at the destination machine. The second type is an RDMA read/write, in which memory space on the remote machine is accessed without the aid of the remote CPU and thus without having to generate an interrupt. The remote CPU determines the memory regions that are exposed for RDMA but typically is unaware of when an RDMA operation is performed.

In an embodiment of the invention described herein, the LWIO protocol is used in association with another network protocol, such as SMB or CIFS, in order to take advantage of the existing security and authentication infrastructure of the other protocol. This helps to minimize the overhead of the LWIO protocol. As illustrated in FIG. 1, the LWIO server 123 on Host B 121 operates above an SMB server 125. An SMB client (not shown) similarly runs on Host A 101 and interacts with the LWIO client application 103.

The LWIO protocol comprises two phases: a discovery phase followed by an I/O phase. In data structures associated with an embodiment described herein, data sizes are as follows:

| | |
|---|---|
| BYTE | unsigned 8-bit integer |
| CHAR | 8-bit ASCII character |
| UINT16 | unsigned 16-bit integer |
| UINT32 | unsigned 32-bit integer |
| UINT64 | unsigned 64-bit integer |
| INT16 | signed 16-bit integer |
| INT32 | signed 32-bit integer |
| INT64 | signed 64-bit integer |
| WCHAR | 16-bit Unicode character |
| PVOID32 | 32-bit pointer |
| PVOID64 | 64-bit pointer |

Figure 2:
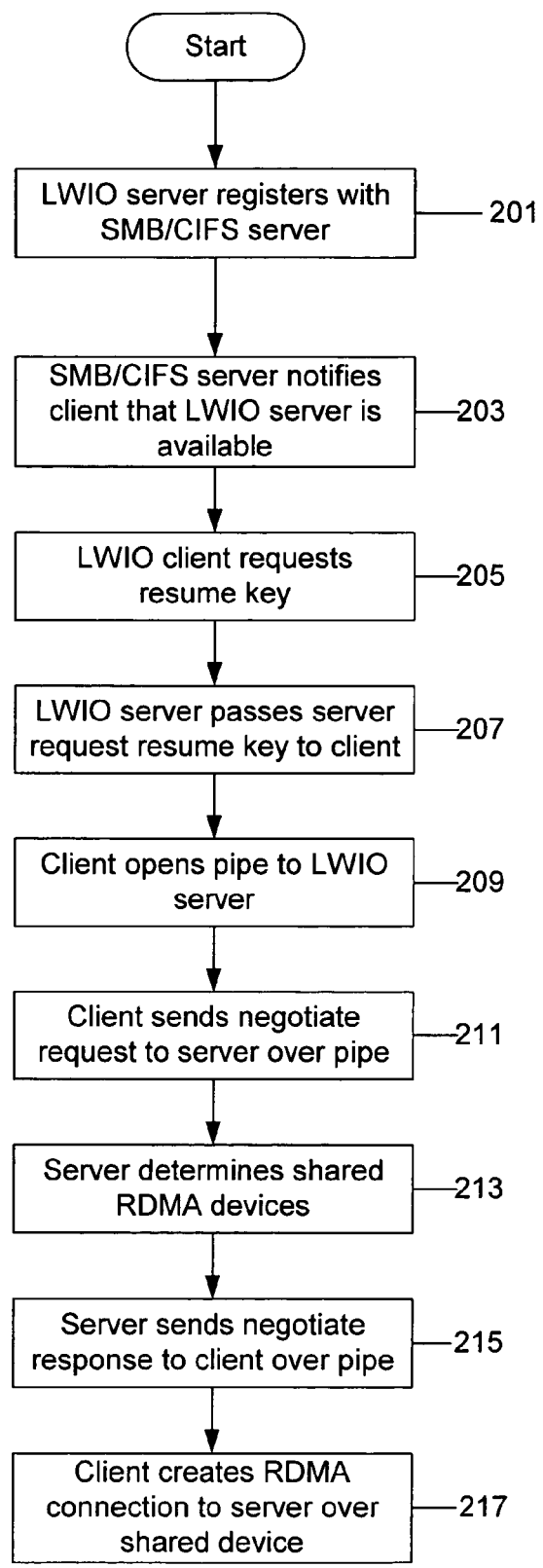
FIG. 2 is a flow diagram generally illustrating initial steps taken in the discovery phase of the LWIO protocol in accordance with an embodiment of the invention.

FIG. 2 illustrates steps taken in the discovery phase of the LWIO protocol in an embodiment of the invention. With respect to the host on which the LWIO server is executing, at step 201 the LWIO server registers with the SMB/CIFS server running on that host machine. In accordance with this registration, at step 203 the SMB/CIFS server notifies a SMB/CIFS client running on a remote host that the LWIO server is available. At step 205 the LWIO client requests a server request resume key. The resume key is an authentication mechanism that has been disclosed in another application having the same assignee as the present application, "Method and System for Accessing a File (Resume Key)," U.S. patent application Ser. No. _____, filed on Oct. 24, 2003, which is hereby incorporated herein in its entirety by reference.

At step 207 the LWIO server passes the server request resume key back to the client. In an embodiment of the invention the server request resume key has the following structure:

```
typedef struct _SRV_RESUME_KEY {
    UINT64              ResumeKey;
    UINT64              Timestamp;
    UINT64              Pid;
} SRV_RESUME_KEY, *PSRV_RESUME_KEY;
typedef struct _SRV_REQUEST_RESUME_KEY {
    SRV_RESUME_KEY      Key;
    UINT16              ContextLength;
    BYTE                Context[1];
} SRV_REQUEST_RESUME_KEY,
*PSRV_REQUEST_RESUME_KEY;
```

Figure 3:
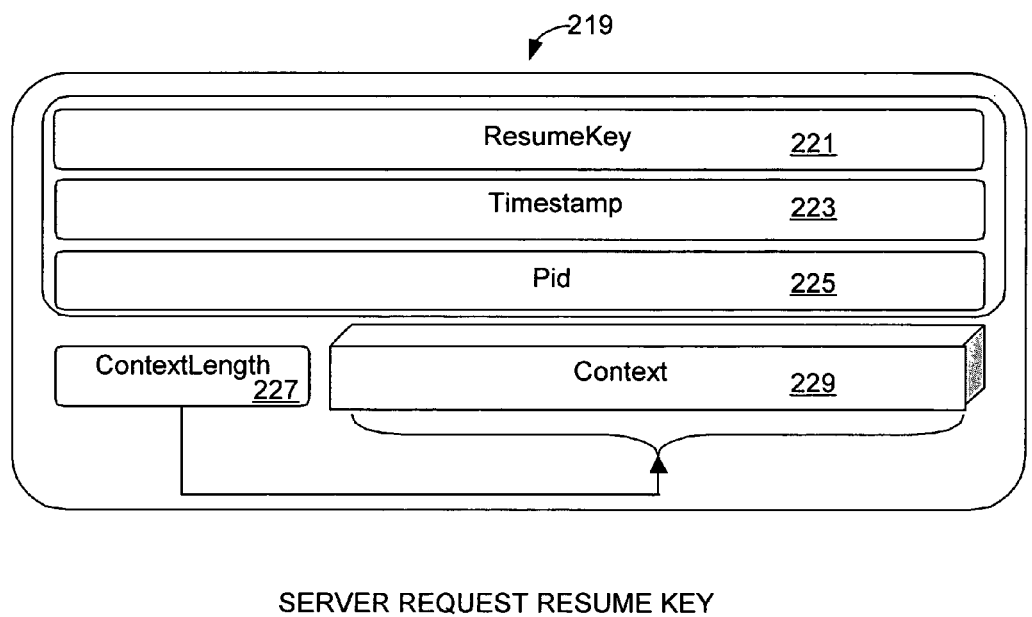
FIG. 3 is a diagram generally illustrating a representation of an exemplary server request resume key in accordance with an embodiment of the invention.

FIG. 3 provides an illustrative representation of the server request resume key 219. ResumeKey 221, Timestamp 223, and Pid 225 are generated on the server and are opaque to the client. Context 229 is an array containing a UNC name that is used by the LWIO client to contact the server. ContextLength 227 is the number of bytes in Context 229.

Network Discovery

When the client application receives the server request resume key 219, it retrieves the server UNC name from the Context field 229. Returning to FIG. 2, at step 209 the client opens a pipe to the LWIO server. The pipe is used for automatic discovery of RDMA-capable devices that are available in the network, in a manner described further below. This is an important and useful feature of the present invention; address resolution mechanisms like ARP are generally absent from VIA networks and similar networks.

The client next queries the server for a list of its RDMA-capable devices ("providers") that are available for use with the LWIO protocol. The querying is accomplished by way of a negotiate request, which the client constructs and sends to the server over the newly-opened pipe at step 211. In an embodiment of the invention, the negotiate request has the following structure:

```
typedef struct {
    LWIO_CONTROL_HEADER;
    WCHAR                ClientName[LWIO_MAX_HOST_NAME];
    UUID                 Key;
    UINT16               ResponseLength;
    UINT16               ProviderCount;
    LwioAddressBlk_t     ProviderList[1];
} LwioNegotiateRequest_t;
typedef struct {
    CHAR                 ProtocolId[4];
    UINT32               RevId;
    UINT16               Opcode;
    UINT16               Length;
} LWIO_CONTROL_HEADER;
typedef struct _GUID {
    UINT32               Data1;
    UINT16               Data2;
    UINT16               Data3;
    BYTE                 Data4[8];
} GUID, UUID;
typedef struct {
    WCHAR                Name[LWIO_MAX_PROVIDER_NAME];
    UINT16               InstanceCount;
    LWIO_NET_ADDRESS     InstanceTable[1];
} LwioAddressBlk_t;
typedef struct _LWIO_NET_ADDRESS {
    UINT16               HostAddressLen;
    UINT16               DiscriminatorLen;
    BYTE                 HostAddressFollowedByDiscriminator[1];
} LWIO_NET_ADDRESS;
```

Figure 4A:
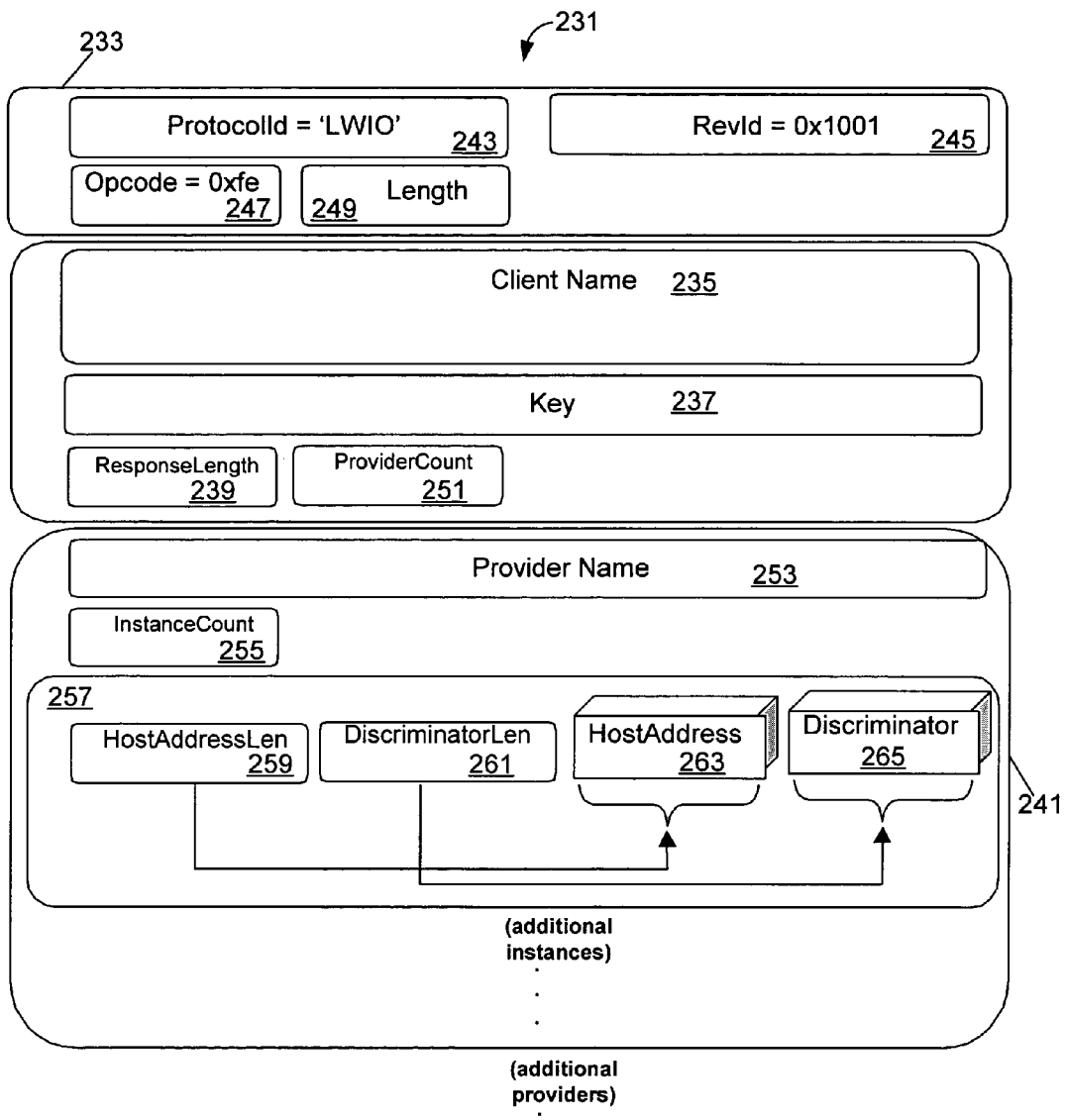
FIG. 4A is a diagram generally illustrating a representation of an exemplary client negotiate request message in accordance with an embodiment of the invention.

FIG. 4A provides an illustrative representation of the negotiate request packet 231 in an embodiment of the invention. The negotiate request includes a control header 233, a fixed-length Unicode client name field 235, a client UUID 237 used as a key, a local buffer size 239 for receiving a response, and the list of providers 241. In the control header 233, the ProtocolId 'LWIO' 243 is stored as the first four bytes of the header. RevId 245 holds a currently defined value 0x1001, LWIO_REV_ID. Opcode 247 holds a currently defined value 0xfe, LWIO_CONTROL_OPCODE_NEGOTIATE. Length 249 is the size in bytes of the complete packet to be sent to the server, including all opcode-specific data.

ClientName 235 is used by the server to identify the client. Key 237 is used in a subsequent network-specific authentication procedure, as described below. ResponseLength 239 is the size of the buffer for receiving a negotiate response from the server, as described below. ProviderCount 251 is the number of providers associated with the client machine and about which the client is informing the server. The provider list 241 contains the list of ProviderCount providers.

In an element of the provider list 241, Name 253 is the name of the provider. In order for compatible networks to be detected, the client and the server should preferably use the same name for the same provider. InstanceCount 255 is the number of devices of a particular provider type. The instance table 257 is a table of network/discriminator pairs, in which a pair serves to describe, in a device-specific way, how to form a remote connection. HostAddressLen 259 is the length of the network-specific host address 263. DiscriminatorLen 261 is the length of the network-specific discriminator 265. Following these length fields are the HostAddressLen bytes of the host address 263 and the DiscriminatorLen bytes of the discriminator 265.

Returning to FIG. 2, having received the negotiate request with the client's list of providers, at step 213 the server determines which RDMA-capable communication devices it has in common with the client. At step 215 the server sends a negotiate response to the client over the pipe, including a list of shared providers. In an embodiment of the invention, the negotiate response has the following structure:

```
typedef struct {
    LWIO_CONTROL_HEADER;
    WCHAR                SrvName[LWIO_MAX_HOST_NAME];
    UUID                 Key;
    UINT16               ProviderCount;
    LwioAddressBlk_t     ProviderList[1];
} LwioNegotiateResponse_t;
```

Figure 4B:
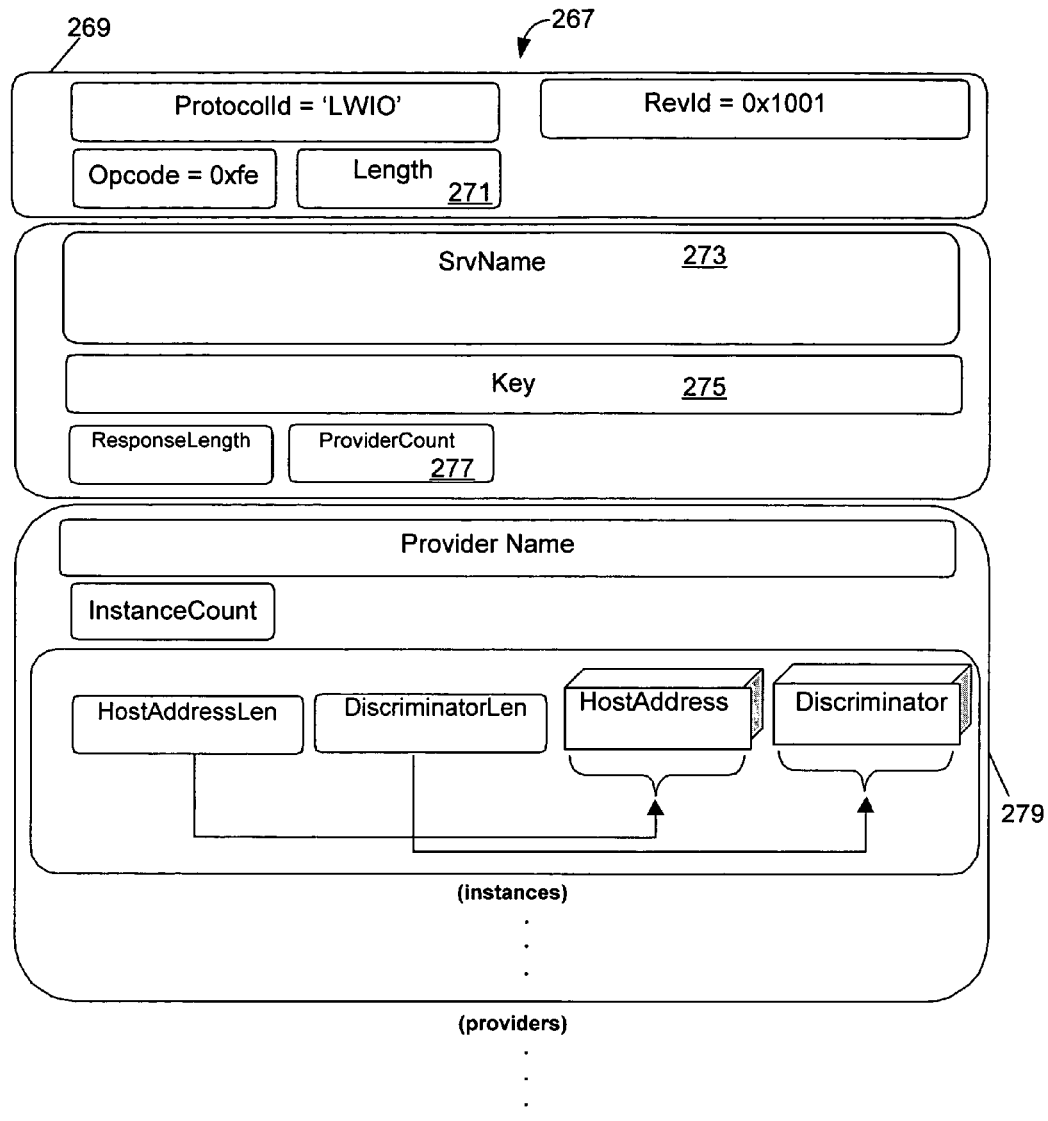
FIG. 4B is a diagram generally illustrating a representation of an exemplary server negotiate response in accordance with an embodiment of the invention.

FIG. 4B provides an illustrative representation of the negotiate response 267 in an embodiment of the invention. The control header 269 is as in the negotiate request, except that Length 271 now reflects the size of the response message 267. SrvName 273 holds the name of the server. Key 275 is a server-generated GUID for use by the client. As explained further below, the client sends the Key back to the server in an authenticate request over a new connection using one of the common communication devices. ProviderCount 277 is the number of providers in the provider list 279. The provider list 279 contains a list of providers common to the server and the client. There is no guarantee that the client can actually connect to these providers.

Returning to FIG. 2, at this point the server and the client have shared communication device information, and the minimal list of common providers has been determined. At step 217 the client creates one or more RDMA connections to the LWIO server over one or more of the shared devices. In an embodiment of the invention, as described herein, the following opcodes are defined for client-to-server communication:

```
#define LWIO_OPCODE_READ         0x0
#define LWIO_OPCODE_WRITE        0x1
```

-continued

```
#define LWIO_OPCODE_VEC_READ      0x2
#define LWIO_OPCODE_VEC_WRITE     0x3
#define LWIO_OPCODE_CLOSE         0x4
#define LWIO_OPCODE_CANCEL        0x5
#define LWIO_OPCODE_AUTH          0x6
#define LWIO_OPCODE_REGISTER      0x7
#define LWIO_OPCODE_CREDIT        0x8
#define LWIO_OPCODE_INTERRUPT     0x9
```

The following defined flags are used as modifiers in client-to-server communication:

```
#define LWIO_HDR_FLAG_INTERRUPT   0x80
#define LWIO_HDR_FLAG_CONTROL     0x40
#define LWIO_HDR_FLAG_COLLAPSE_IO 0x20
```

The corresponding client-to-server messages in the LWIO protocol feature a common header structure. The common header has the following format in an embodiment of the invention:

```
typedef struct {
    UINT32          Length;
    union {
        UINT32      Status;
        struct {
            BYTE    Opcode;
            BYTE    Flags;
            BYTE    Credits;
            BYTE    Marker;
        };
    };
    struct {
        UINT16      Fid;
        UINT16      Sequence;
        UINT32      Tid;
    };
    UINT64          Offset;
    // data buffer block
    struct {
        PVOID64     DataVa;
        union {
            UINT32  DataMh;
            struct {
                UINT16  NumPages;
                UINT16  PageSize;
            } Vec;
        };
    };
    // io status block
    union {
        struct {
            UINT32  IosMh;
            PVOID64 IosVa;
        };
        struct {
            UINT32  ImmediateCookie;
            UINT64  Cookie;
        };
    };
} LWIO_COMMON_HEADER;
```

Connection Authentication

Figure 5:
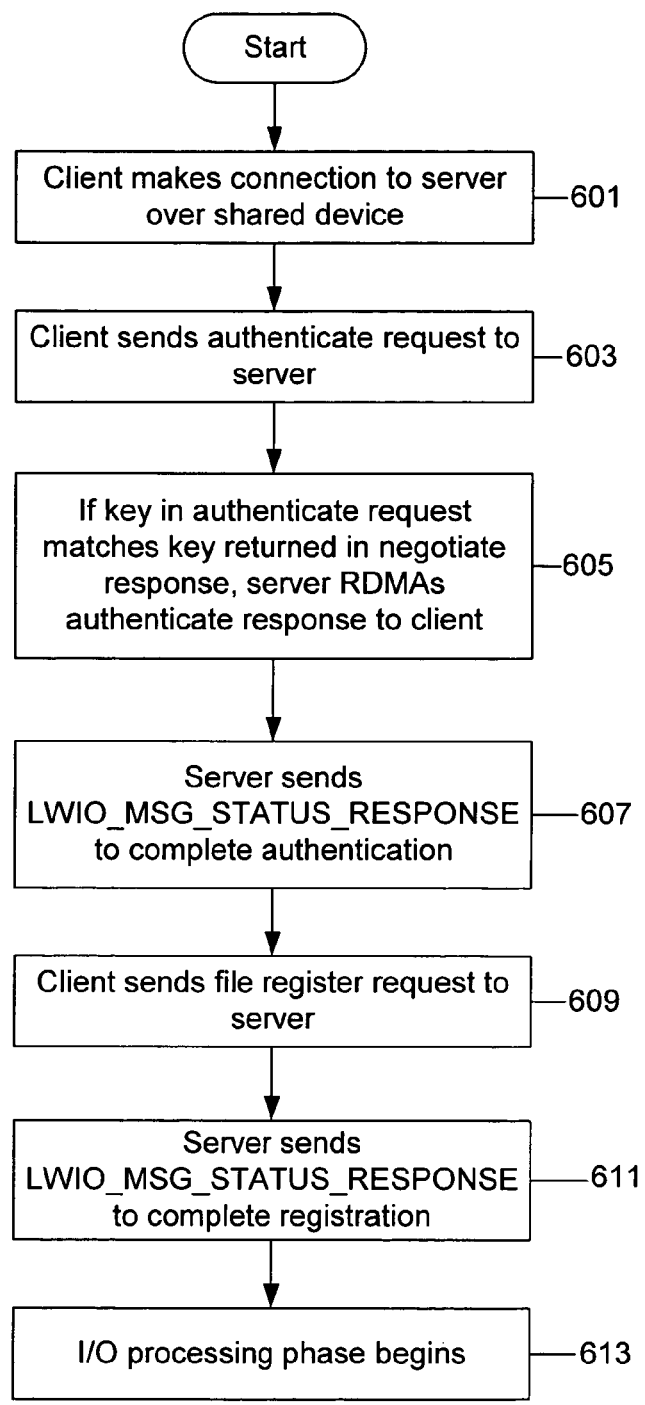
FIG. 5 is a flow diagram generally illustrating additional steps taken in the discovery phase of the LWIO protocol in accordance with an embodiment of the invention.

FIG. 5 illustrates steps taken by the client and the server in an embodiment of the invention, during the remainder of the initial phase of the LWIO protocol. At step 601 the client establishes a connection to the server over a shared communication device, as explained above. The client and the server now mutually authenticate the new connection. At step 603 the client sends an authentication request message (LWIO_OPCODE_AUTH) to the server. Authentication is done in order to prevent server-side and client-side spoofing. If the authentication is not timely completed, the connection is terminated.

Figure 6A:
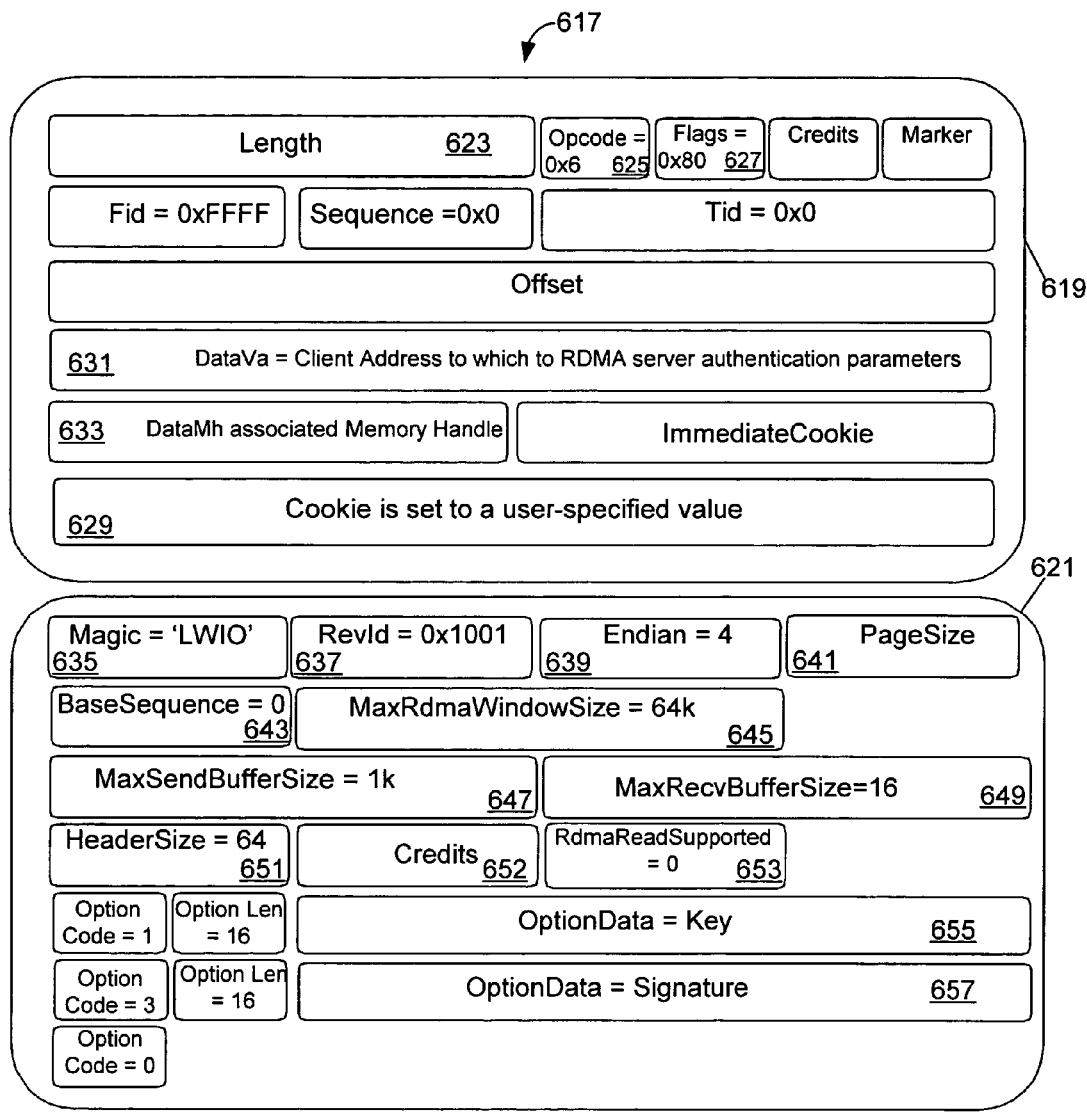
FIG. 6A is a diagram generally illustrating a representation of an exemplary client authenticate request message in accordance with an embodiment of the invention.

FIG. 6A provides an illustrative representation of the client authenticate request message in an embodiment of the invention. The authenticate message 617 comprises the common header 619 followed by an LWIO_AUTH_PARAMS structure 621. In the header 619, Length 623 is set to the number of bytes sent to the server (the size of the common header 619 plus the size of the LWIO_AUTH_PARAMS 621). Opcode 625 is set to LWIO_OPCODE_AUTH (0x6). Flags 627 is set to LWIO_HDR_FLAG_INTERRUPT. Cookie 629, in this and the other client protocol messages, is set to a value chosen by the client and is sent back in the server reply. The Cookie value is typically used to match a request with a server reply. DataVa 631 is set to the address to which the server should RDMA the server authentication parameters. DataMh 633 holds the RDMA memory handle associated with DataVa 631.

In an embodiment of the invention, the LWIO_AUTH_PARAMS structure has the following format:

```
#define LWIO_AUTH_OPTION_END                  0
#define LWIO_AUTH_OPTION_KEY                  1
#define LWIO_AUTH_OPTION_SESSION_ID           2
#define LWIO_AUTH_OPTION_SIGNATURE            3
#define LWIO_AUTH_OPTION_KEY_LENGTH           16
#define LWIO_AUTH_OPTION_SESSION_ID_LENGTH    8
#define LWIO_AUTH_OPTION_SIGNATURE_LENGTH     16
typedef struct {
    UCHAR               OptionCode;
    UCHAR               OptionLen;
    BYTE                OptionData[1];
} LWIO_AUTH_OPTIONS, *LPLWIO_AUTH_OPTIONS;
typedef struct {
    CHAR                Magic[4]; // 'LWIO'
    UINT16              RevId;
    UINT16              Endian;
    UINT16              PageSize;
    UINT16              BaseSequence;
    UINT32              MaxRdmaWindowSize;
    UINT32              MaxSendBufferSize;
    UINT32              MaxRecvBufferSize;
    UINT16              HeaderSize;
    UINT16              Credits;
    UINT16              RdmaReadSupported;
    LWIO_AUTH_OPTIONS   Options[1];
} LWIO_AUTH_PARAMS, *LPLWIO_AUTH_PARAMS;
```

In the authenticate message 617, an LWIO_AUTH_PARAMS 621 forms the second part of the packet. Magic 635 is set to 'LWIO'. RevId 637 is set to LWIO_REV_ID. Endian 639 is set to sizeof(ULONG_PTR). PageSize 641 is set to the CPU page size (4 k on 32-bit machines and 8 k on 64-bit machines). BaseSequence 643 is set to 0. MaxRdmaWindowSize 645 is intended to be set to the maximum number of bytes that the client can accept in an RDMA transfer; in the depicted embodiment it is set to 64 k. MaxSendBufferSize 647 is intended to be set to the number of bytes that the client can send to the server in a single request; in the depicted embodiment it is set to 1 k. MaxRecvBufferSize 649 is intended to be set to the number of bytes that the client has posted to receive data from the server; in the depicted embodiment it is set to 16 bytes. HeaderSize 651 is set to the number of bytes in the LWIO control header 619. Credits 652 is set to the initial number of buffer credits that the client wishes to have. The use of credits is explained further below. The server may or may not satisfy the client's request. RdmaReadSupported 653 is set to 0 if the client does not support RDMA read operations and is set to 1 if the client does support RDMA read.

Part of the LWIO_AUTH_PARAMS structure is a set of one or more options. The options are used to make authentication more flexible. Each option has an option code, length and data, except for the last option in the list, LWIO_AUTH_OPTION_END, which has the option code only, serving as a null option terminating the list of options. In the authenticate message, the client sends the server the following options: Key (LWIO_AUTH_OPTION_KEY) and a signature (LWIO_AUTH_OPTION_SIGNATURE). Key 655 is set to the key previously returned by the server in the negotiate response. Signature 657 is an MD5 signing of the LWIO_AUTH_PARAMS 621 excluding the signature.

Returning to FIG. 5, at step 605, if the Key sent in the authenticate message matches the key that was returned in the negotiate response over the pipe, the server RDMAs to the client as an authenticate response an LWIO_AUTH_PARAMS structure, including an eight-byte SessionId, to the DataVa address and associated DataMh memory handle provided by the client in the authenticate message. At step 607 the server sends an LWIO_MSG_STATUS_RESPONSE to complete the authentication.

Figure 6B:
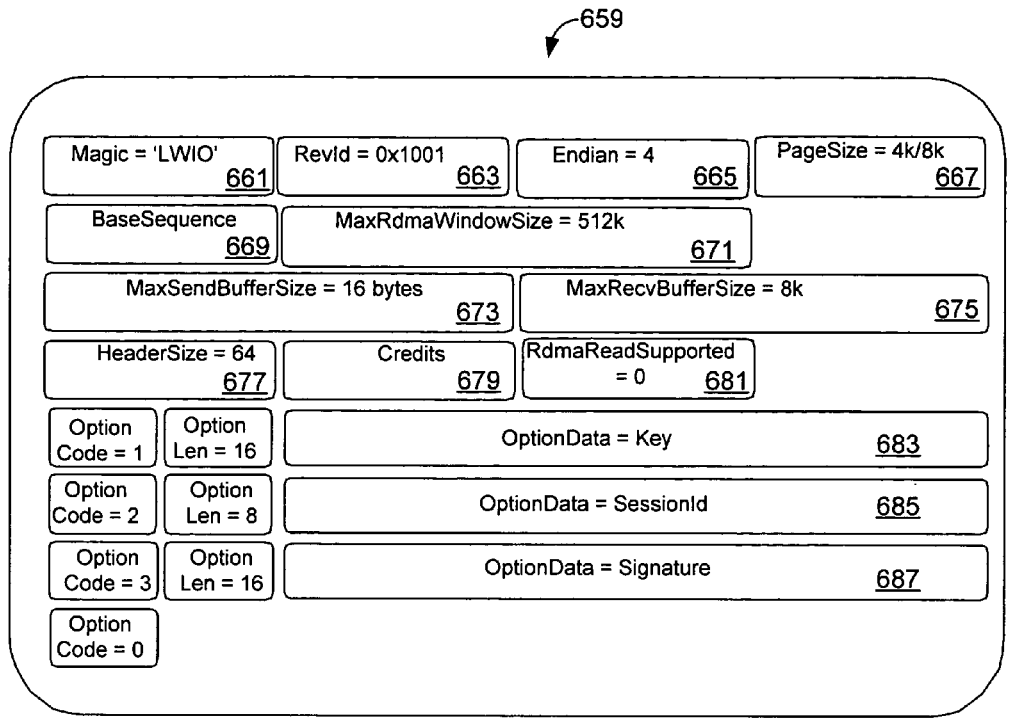
FIG. 6B is a diagram generally illustrating a representation of an exemplary server authenticate response in accordance with an embodiment of the invention.

FIG. 6B provides an illustrative representation of the LWIO_AUTH_PARAMS structure 659 returned by the server in an embodiment of the invention. Magic 661 is set to 'LWIO'. RevId 663 is set to LWIO_REV_ID. Endian 665 is set to sizeof(ULONG_PTR). PageSize 667 is set to the CPU page size. BaseSequence 669 is intended to be set to (client BaseSequence+1). MaxRdmaWindowSize 671 is intended to be set to the maximum number of bytes that the client can accept in an RDMA transfer; in the depicted embodiment it is set to 512 k. MaxSendBufferSize 673 is intended to be set to the number of bytes that the server sends to the client in a single response; in the depicted embodiment it is set to 16 bytes. MaxRecvBufferSize 675 is intended to be set to the number of bytes that the server has pre-posted to receive data from the client; in the depicted embodiment it is set to 8 k. HeaderSize 677 is set to the number of bytes in the common header. Credits 679 is set to the initial number of credits that the server has available for the client. RdmaReadSupported 681 is set to 0 if the server does not support RDMA read and is set to 1 if the server does support RDMA read. The server sends the following options: Key (LWIO_AUTH_OPTION_KEY) 683, SessionId (LWIO_AUTH_OPTION_SESSION_ID) 685, and a Signature (LWIO_AUTH_OPTION_SIGNATURE) 687. Key 683 is set to the Key that the client had sent previously in the Negotiate Request. The SessionId 685 value is used by the client in registering client files with the server, as explained below. Signature 687 is an MD5 signing of the LWIO_AUTH_PARAMS excluding the Signature.

In an embodiment of the invention, the LWIO_MSG_STATUS_RESPONSE structure has the following format:

```
typedef struct _LWIO_IO_STATUS_BLOCK {
    UINT32              Information;
    UINT32              Status;
} LWIO_IO_STATUS_BLOCK,
*LPLWIO_IO_STATUS_BLOCK;
typedef struct _LWIO_MSG_STATUS_RESPONSE {
    UINT64              Cookie;
    LWIO_IO_STATUS_BLOCK Ios;
} LWIO_MSG_STATUS_RESPONSE,
*LPLWIO_MSG_STATUS_RESPONSE;
```

Figure 6C:
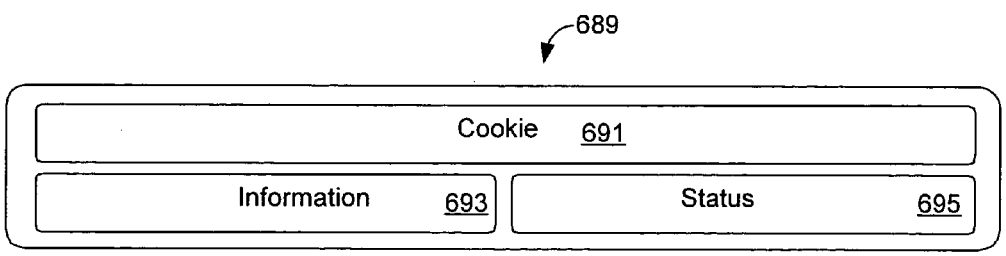
FIG. 6C is a diagram generally illustrating a representation of an exemplary server status response completing authentication in accordance with an embodiment of the invention.

FIG. 6C provides an illustrative representation of the LWIO_MSG_STATUS_RESPONSE 689 returned by the server to complete the authentication in an embodiment of the invention. Cookie 691 is set to the cookie value set by the client in the header of the authenticate message. Information 693 is set to the number of bytes of LWIO_AUTH_PARAMS plus eight bytes. Status 695 is set to 0x0 (signifying success) or 0xC0000022 (signifying "access denied").

File Registration

Returning to FIG. 5, at step 609, when the new connection has been mutually authenticated by the client and the server, the client begins registering files for use with the server. File operations for a file are not processed over a link until the client has registered the file for use with the server.

Figure 7A:
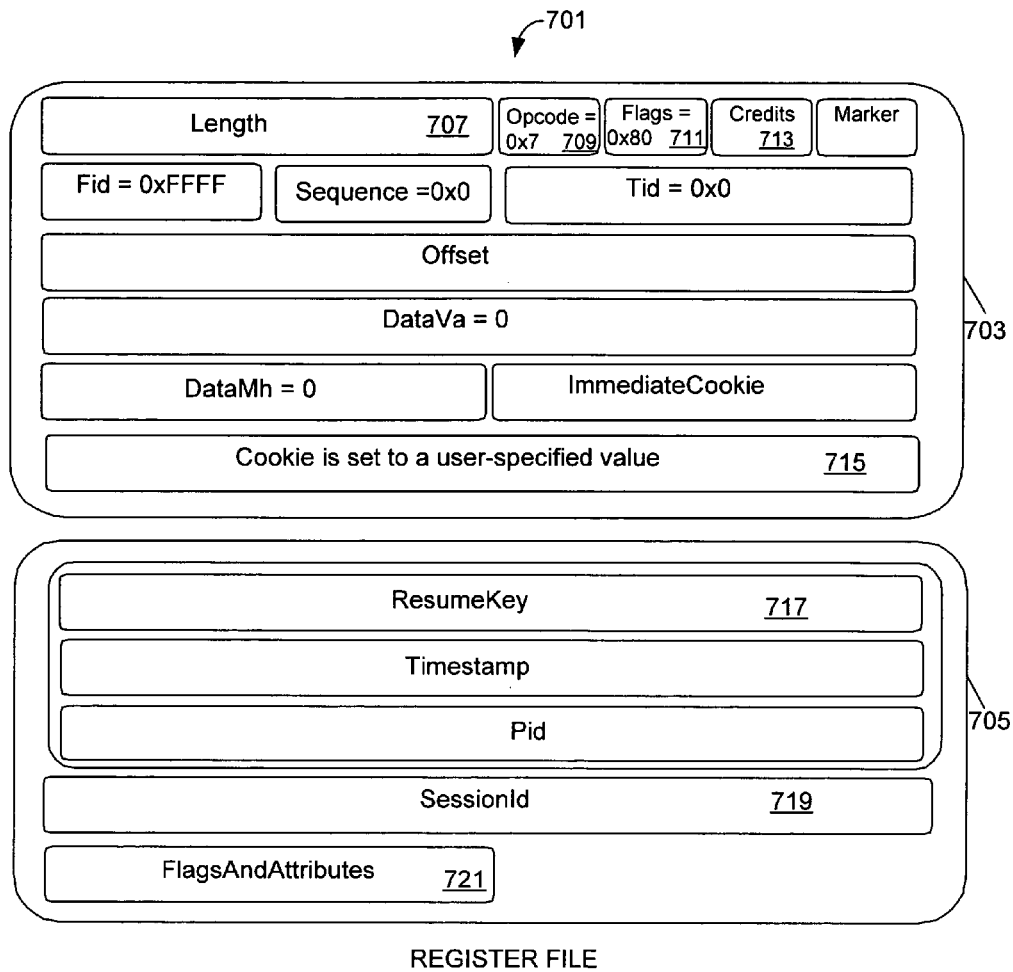
FIG. 7A is a diagram generally illustrating a representation of an exemplary client register file message in accordance with an embodiment of the invention.

FIG. 7A provides an illustrative representation of the register file message sent by the client to the server in an embodiment of the invention. The registration message 701 comprises the common header 703 followed by an LWIO_FID_PARAMS structure 705. Length 707 is set to the number of bytes sent to the server (the size of the header 703 plus the size of the LWIO_FID_PARAMS 705). Opcode 709 is set to LWIO_OPCODE_REGISTER (0x7). Flags 711 is set to LWIO_HDR_FLAG_INTERRUPT. In this client message and subsequent client messages, Credits 713 is set to the number of pending I/O requests on the client. The Credits field serves as a hint to the server to allocate more credits to the connection, thus allowing additional outstanding I/O requests, as explained further below. The number of outstanding client requests at any one time cannot exceed the "Credits" value. As before, Cookie 715 is set to a client-specified value.

In an embodiment of the invention, the LWIO_FID_PARAMS structure has the following format:

```
typedef struct {
    SRV_RESUME_KEY      ResumeKey;
    INT64               SessionId;
    UINT32              FlagsAndAttributes;
} LWIO_FID_PARAMS, *LPLWIO_FID_PARAMS;
```

In the LWIO_FID_PARAMS 705 of the register file message 701, ResumeKey 717 is set to the server request resume key that was returned over the initial file access channel. SessionId 719 is set to the SessionId that was returned by the server during the connection authentication stage. FlagsAndAttributes 721 is set to the Win32 Create Flags used initially to open the file.

Figure 7B:
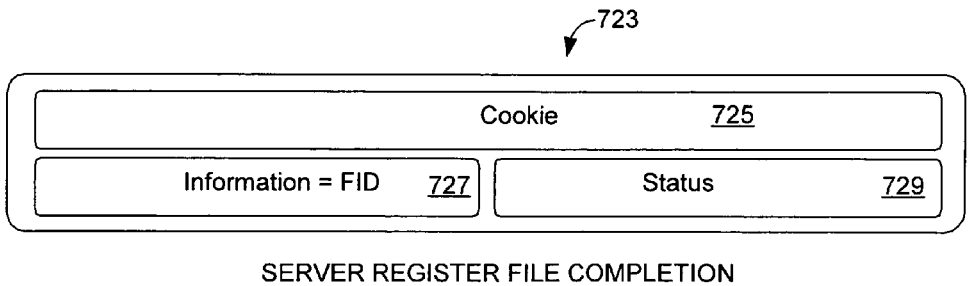
FIG. 7B is a diagram generally illustrating a representation of an exemplary server status response completing file registration in accordance with an embodiment of the invention.

Returning to FIG. 5, at step 611 the server responds with an LWIO_MSG_STATUS_RESPONSE to complete the file registration. FIG. 7B provides an illustrative representation of the LWIO_MSG_STATUS_RESPONSE 723 sent by the server in an embodiment of the invention. Information 725 is set to the Fid (File ID) to be used when sending I/O requests. Status 727 is set to 0x0 (success) or another NTSTATUS code on failure. Cookie 729 is set to the cookie value that the client set in the header of the register file message.

I/O Processing

At this point client connections are established and files have been registered, and the I/O processing phase of the LWIO protocol begins. One key feature of embodiments of the LWIO protocol is an asymmetric I/O model for reads and writes. Read operations are implemented using RDMA, while writes are implemented using send operations. Writes are not implemented using RDMA in order to provide a better security model. If the server exposes its address space over the NIC for RDMA it introduces a data corruption vulnerability that can be exploited by a malicious client. In this scenario, the malicious client issues, in a loop, RDMA write operations on a given server virtual address. Because the server address space is finite and at some point server virtual addresses must be reused, the malicious client eventually catches the server using the same virtual address for a different connection, causing the data to be written into a server buffer that might be associated with a different client. The asymmetric I/O model in the LWIO protocol guards against this possibility. This feature is a principal difference between the LWIO protocol and other RDMA-based file transfer protocols, such as DAFS.

Returning to FIG. 5, at step 613, the client begins posting I/O processing requests. Server-to-client completions of I/O requests are either in non-polling mode or polling mode. In non-polling mode, I/O completions are interrupt-based, using ordinary send/receive messages. In polling mode, I/O completions use RDMA and are not interrupt-based.

Figure 8:
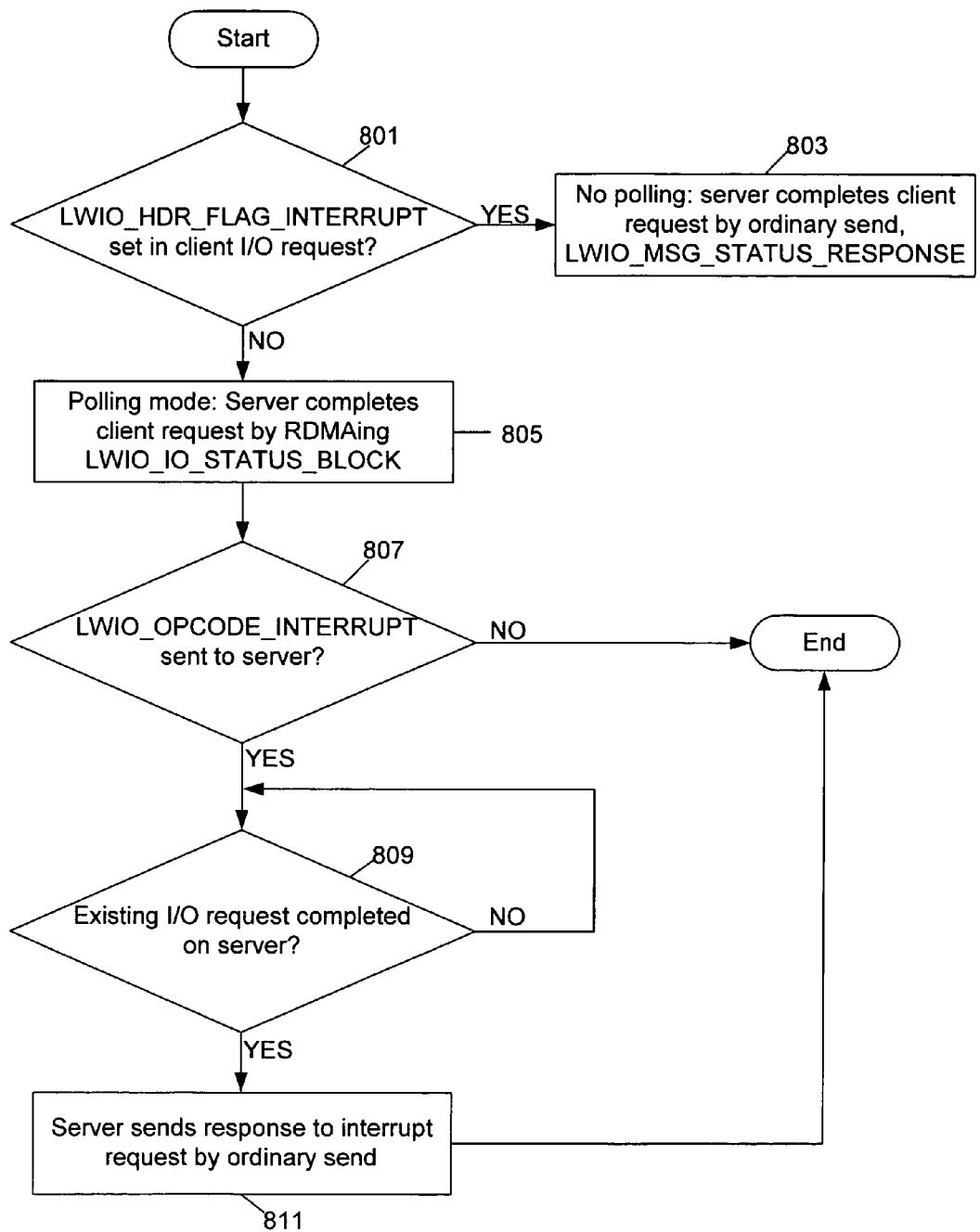
FIG. 8 is a flow diagram generally illustrating steps taken with respect to completion of an I/O request in polling mode and in non-polling mode, in accordance with an embodiment of the invention.

The flow diagram of FIG. 8 generally illustrates, from the general perspective of the LWIO server, steps taken in an embodiment of the invention with respect to completing an I/O request in polling mode or non-polling mode. A client I/O request specifies whether the server should send back a post-send (interrupting the CPU) or an RDMA message. At step 801, the server determines whether an LWIO_HDR_FLAG_INTERRUPT flag is set in the common header of the client I/O request message. If this flag is set, at step 803 the server completes the client request by way of an LWIO_MSG_STATUS_RESPONSE using an ordinary send. If the LWIO_HDR_FLAG_INTERRUPT flag is not set (polling mode), then the server completes the client request by RDMAing an LWIO_IO_STATUS_BLOCK to the client, as indicated at step 805.

Wakeup of Client in Polling Mode

In polling mode, the client may wish to sleep while waiting for an I/O completion from the server. Completions in this case are sent by way of RDMA to the client, so a mechanism is needed to wake up the client to notify it that a completion has occurred. If the client wishes to be woken up, it sends an interrupt request (LWIO_OPCODE_INTERRUPT) message to the server, received by the server at step 807 of FIG. 8. A server that receives an interrupt request will not send a response until an I/O request has completed on the server (step 809). The completion is sent to the client at step 811 by way of an ordinary send, interrupting the client. Only one interrupt message can be outstanding for a given client connection.

Figure 9A:
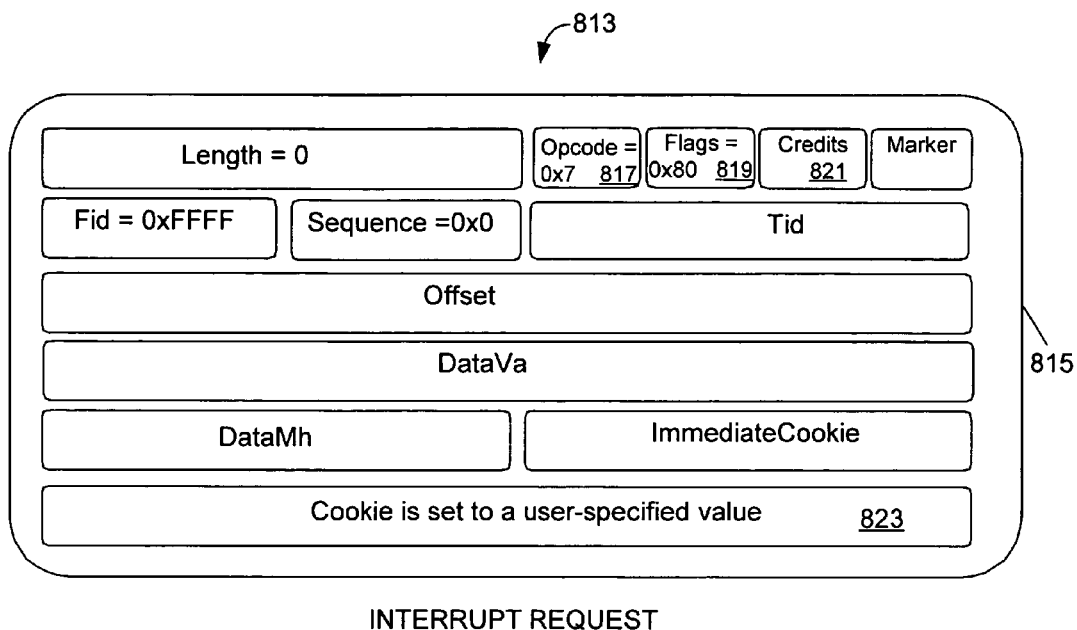
FIG. 9A is a diagram generally illustrating a representation of an exemplary client interrupt request message in accordance with an embodiment of the invention.

FIG. 9A provides an illustrative representation of the interrupt request message sent by the client to the server in an embodiment of the invention. The message comprises the common header 815. Opcode 817 is set to LWIO_OPCODE_REGISTER (0x9). Flags 819 is set to (LWIO_HDR_FLAG_INTERRUPT|LWIO_HDR_FLAG_CONTROL) (0xC0). Credits 821 is set to the number of pending I/O requests on the client, and Cookie 823 is set to a client-specified value.

Figure 9B:
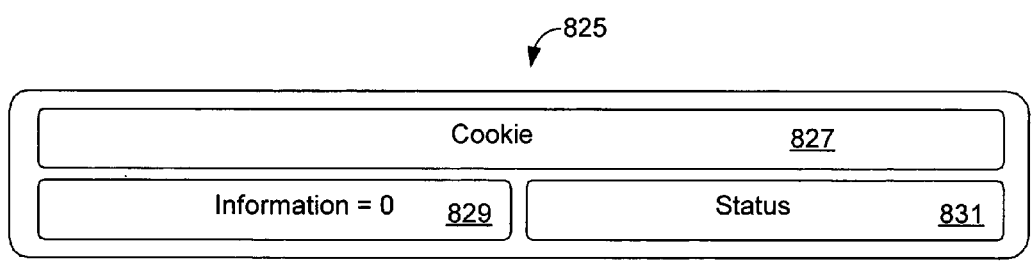
FIG. 9B is a diagram generally illustrating a representation of an exemplary server status response completing an interrupt request in accordance with an embodiment of the invention.

The server responds to the interrupt request message after another I/O request has been processed. FIG. 9B provides an illustrative representation of the LWIO_MSG_STATUS_RESPONSE message 825 sent by server in an embodiment of the invention. Information 827 is set to 0. Status 829 is set to 0x0 (success) or another NTSTATUS code on failure. Cookie 831 is set to the Cookie value in the header of the interrupt request sent by the client.

Credits

As has been noted, all client-to-server I/O requests include a credits field in the header. The credits field is a hint to the server regarding the number of outstanding I/O requests that the client would like to send to the server. It is the responsibility of the server to manage credits. Credits provide a novel solution to the problem of flushing buffers. If the client currently has N credits, it is required to post N+1 receive buffers in order for the server to send the client a credit message. The server has only one outstanding credit request along a client connection at any one time. Credit messages are always sent in interrupt mode.

Figure 10:
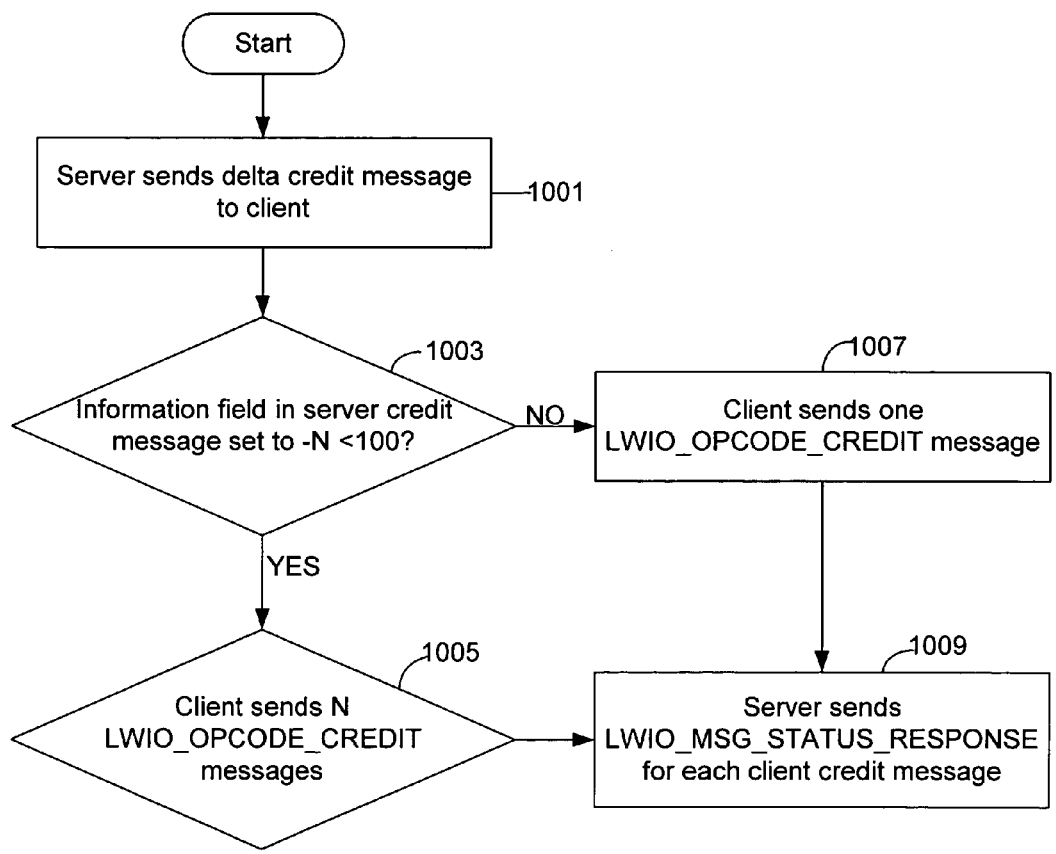
FIG. 10 is a flow diagram generally illustrating steps taken with respect to a server-client credit transaction in accordance with an embodiment of the invention.

A credit transaction comprises a server-initiated three-way handshake between client and server. FIG. 10 generally illustrates the steps comprising the credit transaction in an embodiment of the invention. At step 1001 the server sends a delta credit request message along a client connection.

Figure 11A:
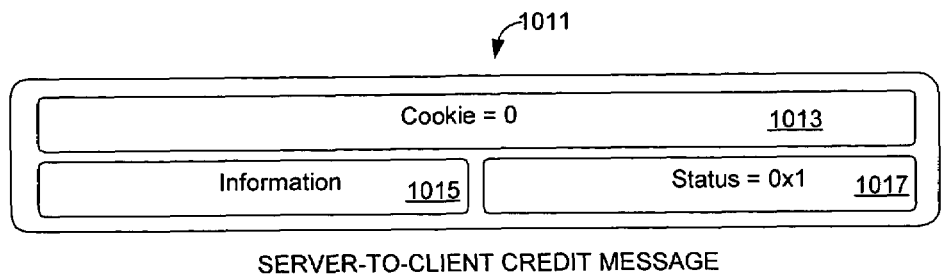
FIG. 11A is a diagram generally illustrating a representation of an exemplary server delta credit message in accordance with an embodiment of the invention.

FIG. 11A provides an illustrative representation of the server delta credit message in an embodiment of the invention. This message takes the form of an LWIO_MSG_STATUS_RESPONSE 1011. Credits correspond to buffers. Information 1013 is set to the number of credits that the client should give up (a negative number) or the number of credits (extra buffers) that the server has newly allocated for the client's use (a positive number). Status 1015 is set to LWIO_NOTIFY_CREDIT (0x1). Cookie 1017 is set to 0.

Returning to FIG. 10, the client receives the credit message from the server. The client is required to respond with an LWIO_OPCODE_CREDIT message to the server on the same connection. This message signifies either the releasing of a single credit or notifying the server of the number of the newly-allocated credits that the client has used. If the Information field in the server credit message contains a negative number, −N (step 1003), the client sends N LWIO_OPCODE_CREDIT messages (one for each credit that it is required to give up), indicated as step 1005. If the Information field is positive, then the client sends only one LWIO_OPCODE_CREDIT message, indicated as step 1007.

Figure 11B:
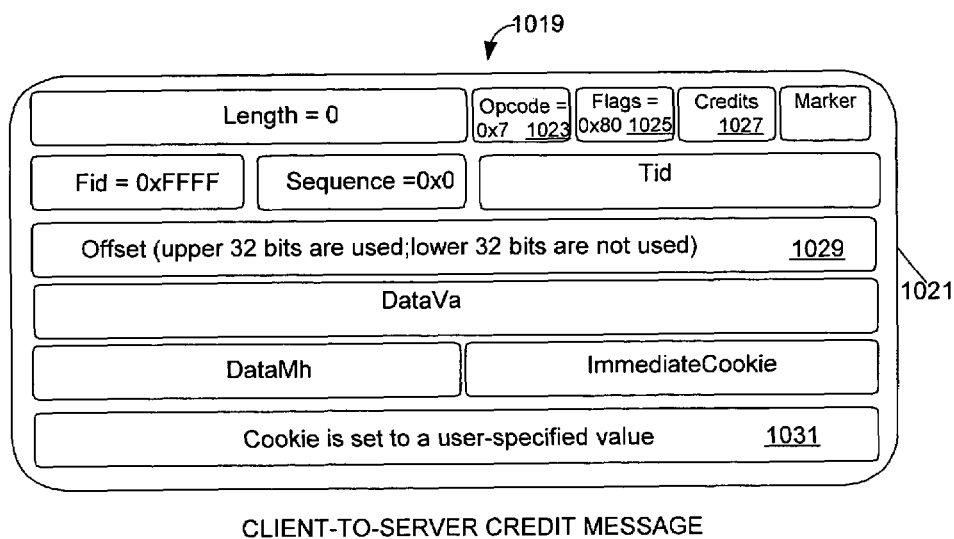
FIG. 11B is a diagram generally illustrating a representation of an exemplary client-to-server credit message in accordance with an embodiment of the invention.

FIG. 11B provides an illustrative representation of the LWIO_OPCODE_CREDIT message sent by the client in an embodiment of the invention. The LWIO_OPCODE_CREDIT message 1019 comprises a common header 1021. Opcode 1023 is set to LWIO_OPCODE_CREDIT (0x8). Flags 1025 is set to LWIO_HDR_FLAG_INTERRUPT (0x80). Credits 1027 is set to the number of pending I/O requests on the client. Cookie 1031 is set to a client-specified value. If the client received a positive delta credit message, the upper 32 bits of Offset 1029 are set to the number of credits allocated by the server that the client did not use. Once the client returns a value greater than zero in this field, the server normally does not send another positive update message until at least one negative update is sent. Typically, the client returns zero.

As noted above, if the client received a negative (−N) delta credit message, the client is required to send N credit messages to the server, one for each credit that it is giving up. The upper 32 bits of Offset 1029 in this case are accordingly set to −N, −(N−1), . . . , −1. When the server receives the client credit message with the upper 32 bits of Offset 1029 set to −1, the server assumes that the client has finished processing the server credit message and is eligible to receive new credit messages.

Figure 11C:
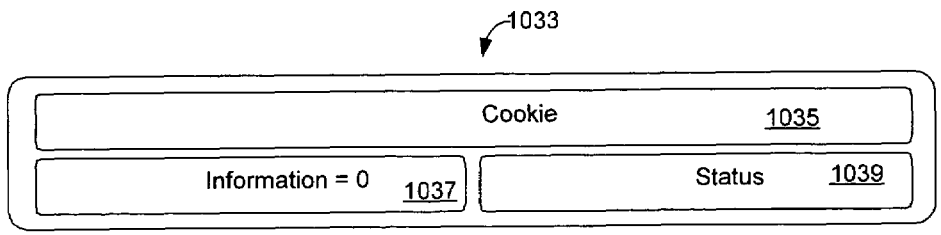
FIG. 11C is a diagram generally illustrating a representation of an exemplary server status response completing a client-server credit transaction in accordance with an embodiment of the invention.

Returning to FIG. 10, the server completes the three-way handshake by sending an LWIO_MSG_STATUS_RESPONSE message to the client, indicated as step 1009. FIG. 11C provides an illustrative representation of the LWIO_MSG_STATUS_RESPONSE 1033 sent by the server in an embodiment of the invention. Information 1037 is set to 0. If the upper 32 bits of Offset in the header of the LWIO_OPCODE_CREDIT message sent by the client was greater than or equal to zero, Status 1039 is set to 0x0, signifying success. If the upper 32 bits of Offset were set to a negative number, the server sets Status 1039 to LWIO_CREDIT_NOTIFY in order to allow the client to retire the credit. Cookie 1035 is set to the Cookie value set by the client in the common header of the LWIO_OPCODE_CREDIT message.

Close

Figure 12A:
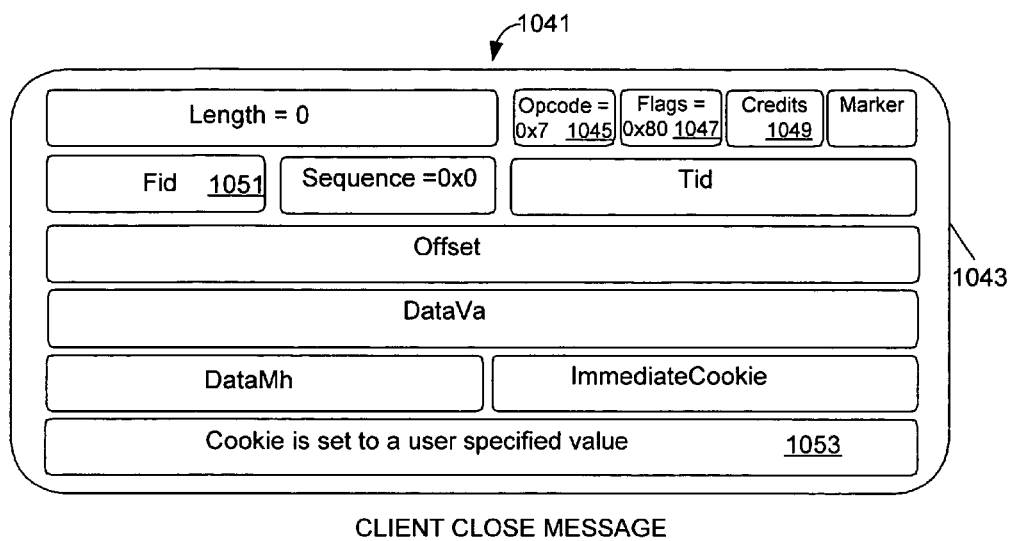
FIG. 12A is a diagram generally illustrating a representation of an exemplary client close request message in accordance with an embodiment of the invention.

The close message is used to stop I/O processing for a particular Fid that was exchanged during the registration stage. Once the server responds, any new requests will fail until the Fid is recycled. FIG. 12A provides an illustrative representation of the close message sent by the client in an embodiment of the invention. The close message 1041 comprises a common header 1043. Opcode 1045 is set to LWIO_OPCODE_CLOSE (0x4). Flags 1047 is set to LWIO_HDR_FLAG_INTERRUPT (0x80). Credits 1049 is set to the number of pending I/O requests on the client. Cookie 1053 is set to a client-specified value. Fid 1051 is set to the File Id of the file that is to be closed.

Figure 12B:
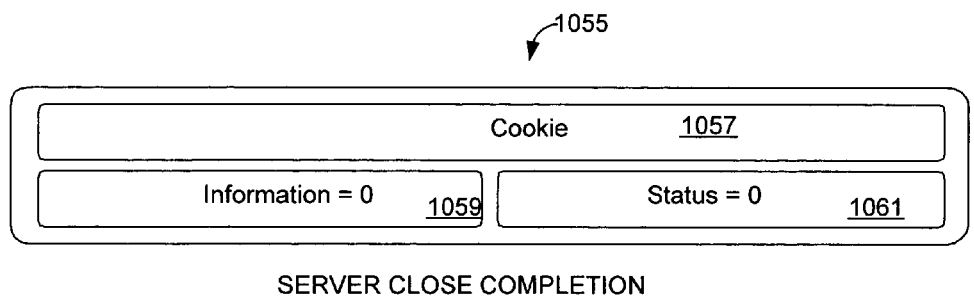
FIG. 12B is a diagram generally illustrating a representation of an exemplary server status response completing a close request in accordance with an embodiment of the invention.

The server responds with an LWIO_MSG_STATUS_RESPONSE. FIG. 12B provides an illustrative representation of the close completion LWIO_MSG_STATUS_RESPONSE 1055 returned by the server in an embodiment of the invention. Information 1059 is set to 0. Status 1061 is set to 0, indicating success. Cookie 1057 is set to the Cookie value that was set in the client close request.

Cancel

Figure 13A:
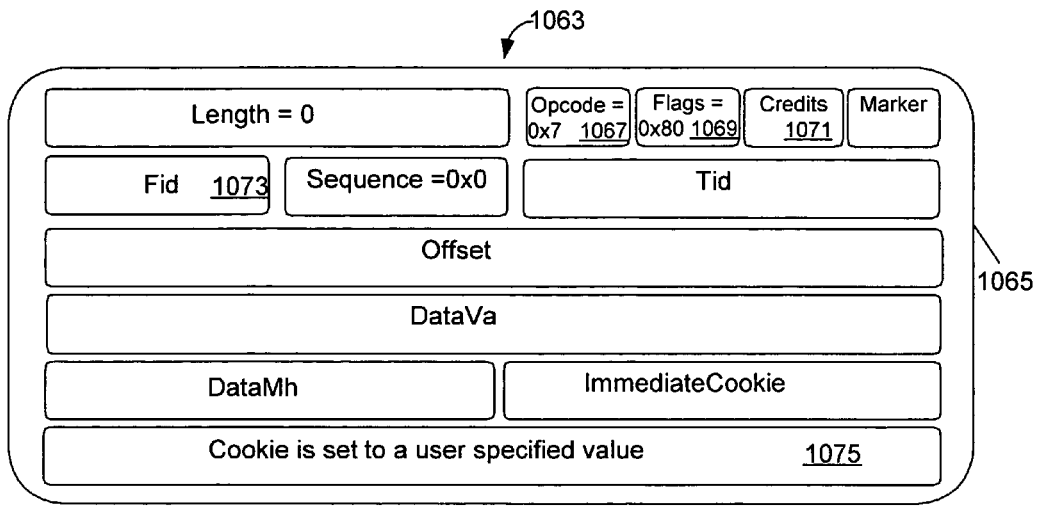
FIG. 13A is a diagram generally illustrating a representation of an exemplary client cancel request message in accordance with an embodiment of the invention.

The cancel message is used to stop I/O processing for a particular Fid that was exchanged during the registration stage. When the cancel is issued, the server completes the request. However, I/O requests that cannot be canceled may still proceed on the server. FIG. 13A provides an illustrative representation of the cancel message sent by the client in an embodiment of the invention. The cancel message 1063 comprises a common header 1065. Opcode 1067 is set to LWIO_OPCODE_CANCEL (0x5). Flags 1069 is set to LWIO_HDR_FLAG_INTERRUPT (0x80). Credits 1071 is set to the number of pending I/O requests on the client. Cookie 1075 is set to a client-specified value. Fid 1073 is set to the File Id on which the cancel is being issued.

Figure 13B:
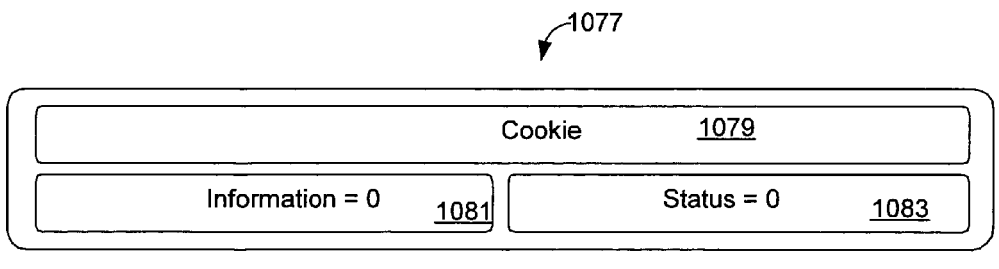
FIG. 13B is a diagram generally illustrating a representation of an exemplary server status response completing a cancel request in accordance with an embodiment of the invention.

The server completes the cancel with an LWIO_MSG_STATUS_RESPONSE message. FIG. 13B provides an illustrative representation of the cancel completion LWIO_MSG_STATUS_RESPONSE 1077 returned by the server in an embodiment of the invention. Information 1081 is set to 0. Status 1083 is set to 0, indicating success. Cookie 1079 is set to the Cookie value that was set in the client cancel request.

Read

The read message is used to obtain data from a particular Fid that was exchanged during the registration stage. For a read request smaller than one kilobyte, if the user buffer is not registered with the NIC, the data is received into an internal pre-registered buffer, and a copy is performed into the user buffer once the data is received from the server. This is done because it is more efficient to copy small amounts of data rather than to register small user buffers. For large reads the user buffer is registered and the data is received directly by way of RDMA write. The amount of data read pursuant to a single read request is limited by the server MaxRdmaWindowSize.

Figure 14A:
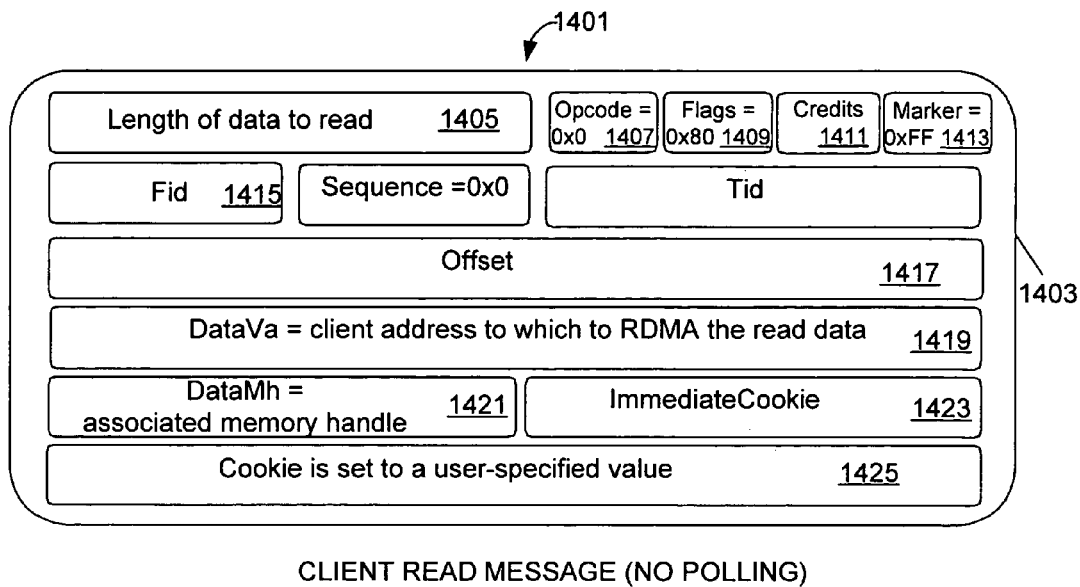
FIG. 14A is a diagram generally illustrating a representation of an exemplary client read request message in the non-polling mode case, in accordance with an embodiment of the invention.
Figure 14B:
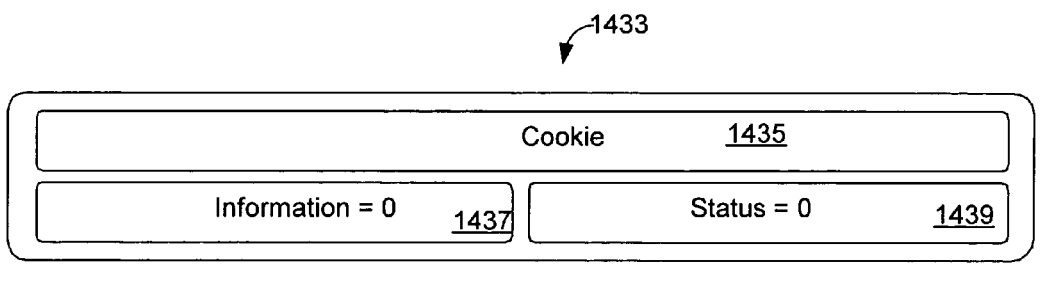
FIG. 14B is a diagram generally illustrating a representation of an exemplary server status response completing a read request in the non-polling mode case, in accordance with an embodiment of the invention.
Figure 14C:
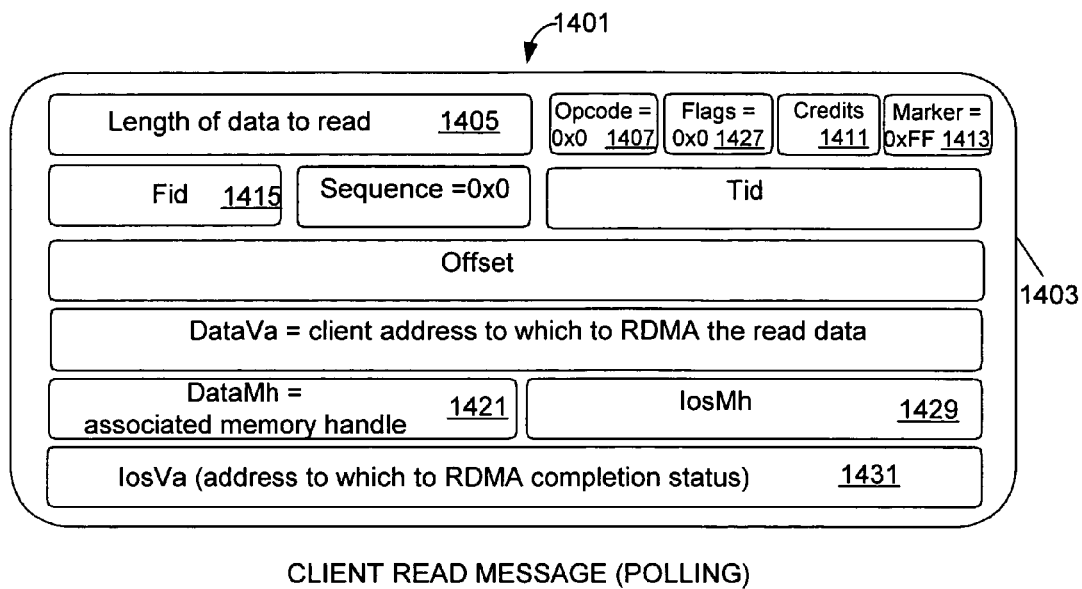
FIG. 14C is a diagram generally illustrating a representation of an exemplary client read request message in the polling mode case, in accordance with an embodiment of the invention.

FIGS. 14A and 14C provide illustrative representations of the read message sent by the client in an embodiment of the invention, with FIG. 14A giving the non-polling case and FIG. 14C giving the polling case. The read message 1401 comprises a common header 1403. Length 1405 is set to the number of bytes to be read from the associated file. Opcode 1407 is set to LWIO_OPCODE_READ (0x0). Offset 1417 is set to the byte location at which the file read is to begin. Marker 1413 is set to 0xFF. Flags 1409, 1427 is set to 0x0 in the polling case 1427 or LWIO_HDR_FLAG_INTERRUPT (0x80) in the non-polling case 1409. Credits 1411 is set to the number of pending I/O requests on the client. Fid 1415 is set to the File Id on which to issue the I/O. DataVa 1419 is set to the address to which the read data is to be RDMAed, and DataMh 1421 is set to the associated memory handle.

In the non-polling case, ImmediateCookie 1423 and Cookie 1425 are set to client-specified values. The server can complete the read request in this case with an LWIO_MSG_STATUS_RESPONSE by way of a normal send, or with an RDMA with immediate data if the read is successful. The immediate data of the RDMA write is accordingly set to the ImmediateCookie value of the read request. In the polling case, IosVa 1431 is set to the location to which the server response status (LWIO_IO_STATUS_BLOCK) is RDMAed, and IosMh 1429 is set to the associated memory handle.

In the non-polling case, the server first RDMAs the read data. The server then can respond with an LWIO_MSG_STATUS_RESPONSE, or the server can send immediate data with the RDMA read data, in which case the immediate data is set to the ImmediateCookie value of the read request. FIG. 14B provides an illustrative representation of the LWIO_MSG_STATUS_RESPONSE 1433 returned by the server in the non-polling case in an embodiment of the invention.

Information 1437 is set to the number of bytes read. Status 1439 is set to 0, indicating success, or to another NTSTATUS, indicating failure. Cookie 1435 is set to the Cookie value set by the client in the header of the read message.

Figure 14D:
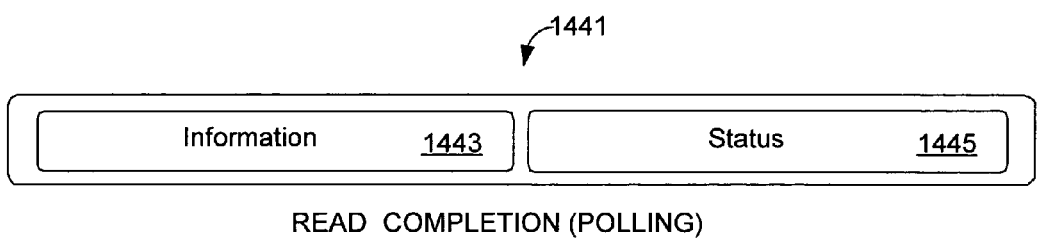
FIG. 14D is a diagram generally illustrating a representation of an exemplary server I/O status block completing a read request in the polling mode case, in accordance with an embodiment of the invention.

In the polling case, the server first RDMAs the read data. The server then RDMAs an LWIO_IO_STATUS_BLOCK to the client. FIG. 14D provides an illustrative representation of the LWIO_IO_STATUS_BLOCK 1441 returned by the server in an embodiment of the invention. Information 1443 is set to the number of bytes read. Status 1445 is set to 0, indicating success, or another NTSTATUS, indicating failure.

Write

The write message is used to place data into a particular Fid that was exchanged during the file registration. All write data is sent using ordinary send operations. The amount of data written is limited by the server MaxRecvBufferSize. If the client sends more data than this, the connection is terminated.

Figure 15A:
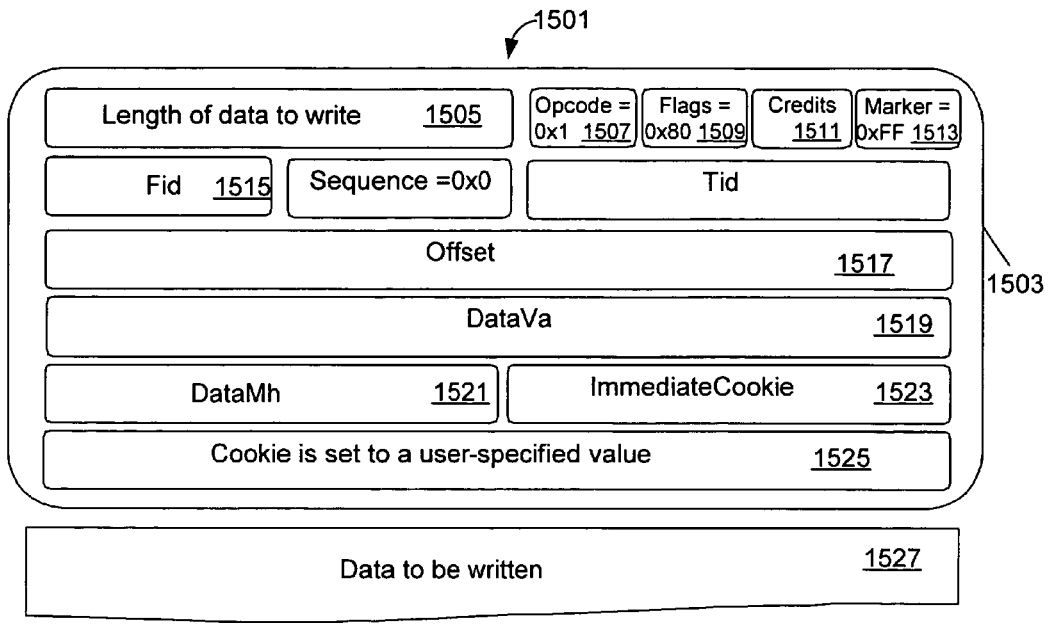
FIG. 15A is a diagram generally illustrating a representation of an exemplary client write request message in the non-polling mode case, in accordance with an embodiment of the invention.
Figure 15B:
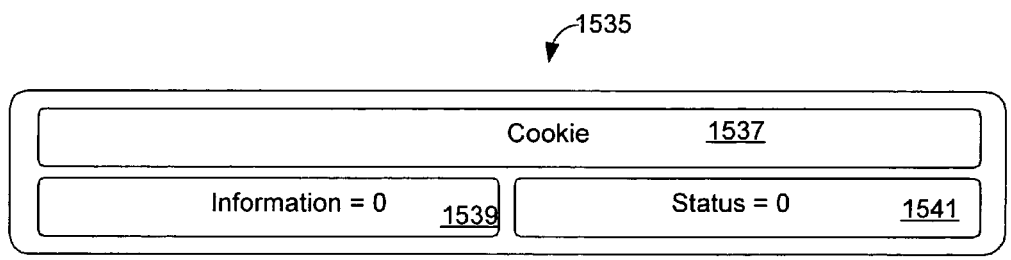
FIG. 15B is a diagram generally illustrating a representation of an exemplary server status response completing a write request in the non-polling mode case, in accordance with an embodiment of the invention.
Figure 15C:
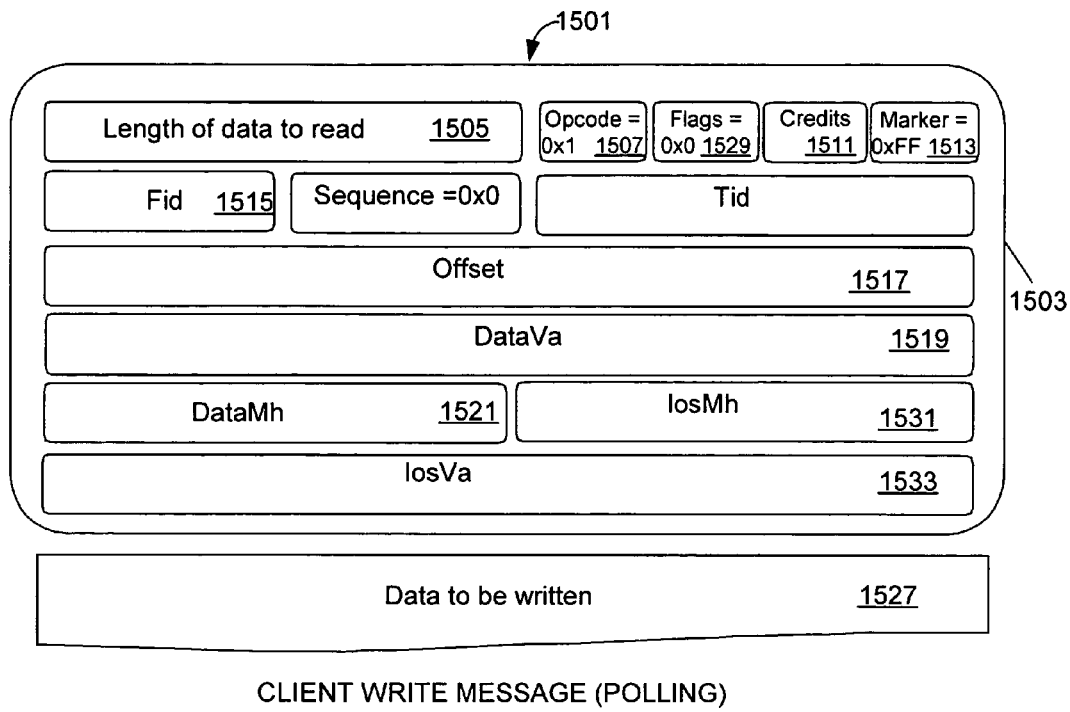
FIG. 15C is a diagram generally illustrating a representation of an exemplary client write request message in the polling mode case, in accordance with an embodiment of the invention.

FIGS. 15A and 15C provide illustrative representations of the write message sent by the client in an embodiment of the invention, with FIG. 15A giving the non-polling case and FIG. 15C giving the polling case. The write message 1501 includes a common header 1503. Length 1505 is set to the number of bytes of data to be written. Opcode 1507 is set to LWIO_OPCODE_WRITE (0x1). Offset 1517 is set to the byte location at which to begin writing the file data. Flags 1509, 1529 is set to 0x0 in the polling case 1529 or LWIO_HDR_FLAG_INTERRUPT (0x80) in the non-polling case 1509. Marker 1513 is set to 0xFF. Credits 1511 is set to the number of pending I/O requests on the client. Fid 1515 is set to the File Id on which to issue the I/O. The data to be written 1527 immediately follows the common header 1503 of the write message.

In the non-polling case, Cookie 1525 is set to a client-specified value. In the polling case, IosVa 1533 is set to the location at which the server response status (LWIO_IO_STATUS_BLOCK) is RDMAed, and IosMh 1531 is set to the associated memory handle.

Figure 15D:
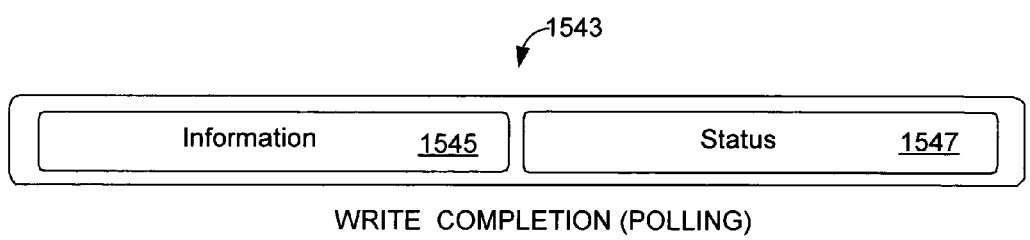
FIG. 15D is a diagram generally illustrating a representation of an exemplary server I/O status block completing a write request in the polling mode case, in accordance with an embodiment of the invention.

In the non-polling case, the server responds to the write message with an LWIO_MSG_STATUS_RESPONSE. FIG. 15B provides an illustrative representation of the LWIO_MSG_STATUS_RESPONSE 1535 returned by the server in an embodiment of the invention. Information 1539 is set to the number of bytes written. Status 1541 is set to 0, indicating success, or to another NTSTATUS, indicating failure. Cookie 1537 is set to the Cookie value set by the client in the header of the write message. In the polling case, the server RDMAs an LWIO_IO_STATUS_BLOCK. FIG. 15D provides an illustrative representation of the LWIO_IO_STATUS_BLOCK 1543 returned by the server in an embodiment of the invention. Information 1545 is set to the number of bytes written. Status 1547 is set to 0, indicating success, or to another NTSTATUS, indicating failure.

Vectored Read

The vectored read is used to obtain data from a particular Fid that was exchanged during the registration stage and to scatter the data on a page basis to multiple segments on the requester. All data read is sent to the requester by way of RDMA writes, with one RDMA write from the server for each read segment. The data read from disk is contiguous. The amount of data read is limited by the maximum number of destination pages that can be described in a single request. This limit is the server MaxRecvBufferSize divided by sizeof (LWIO_RDMA_REGION). The structure of LWIO_RDMA_REGION is given below.

Figure 16A:
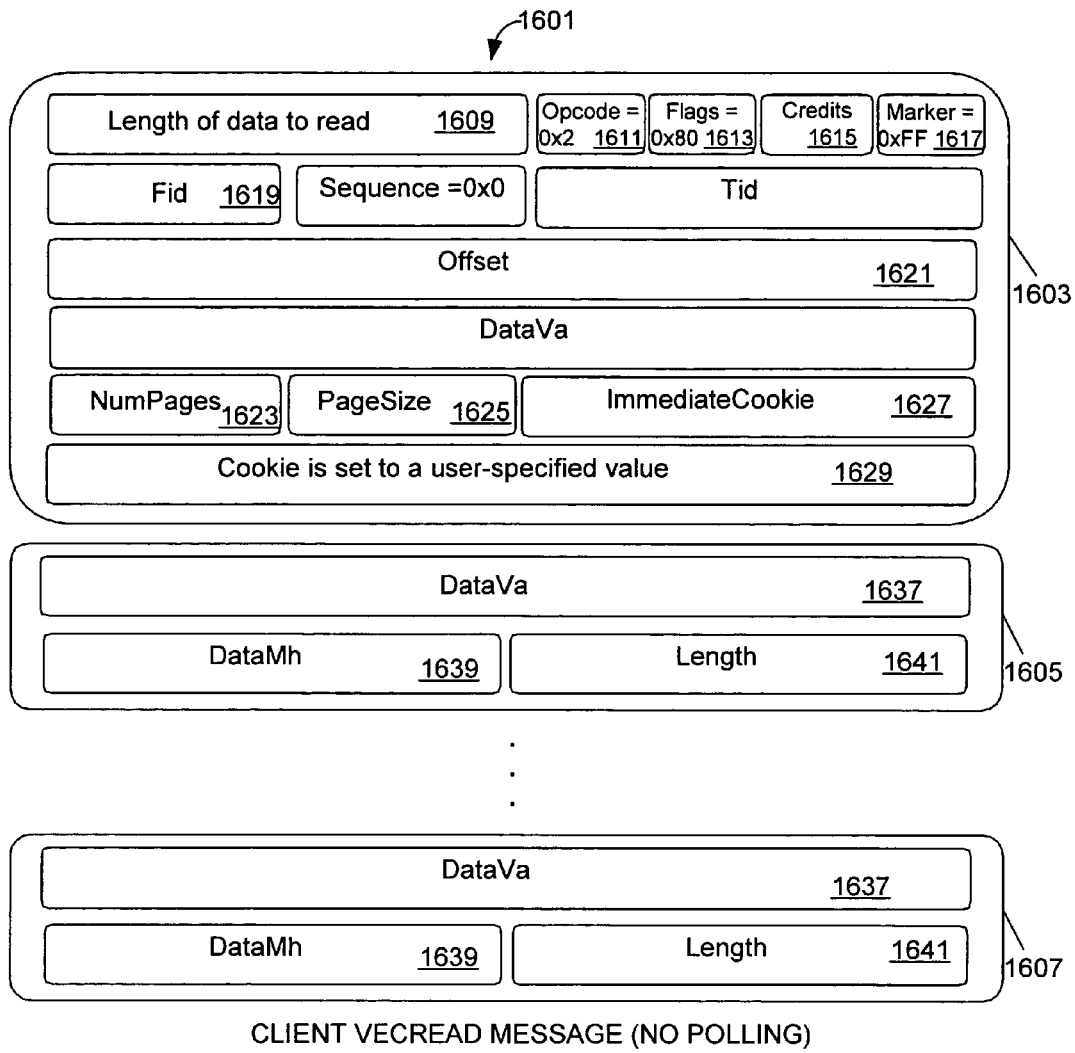
FIG. 16A is a diagram generally illustrating a representation of an exemplary client vectored read request message in the non-polling mode case, in accordance with an embodiment of the invention.
Figure 16B:
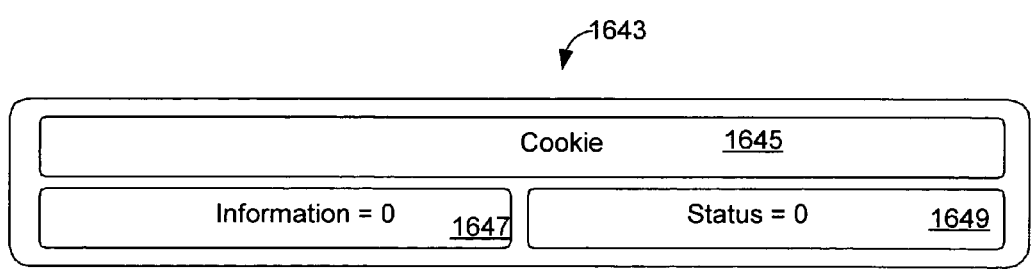
FIG. 16B is a diagram generally illustrating a representation of an exemplary server status response completing a vectored read request in the non-polling mode case, in accordance with an embodiment of the invention.
Figure 16C:
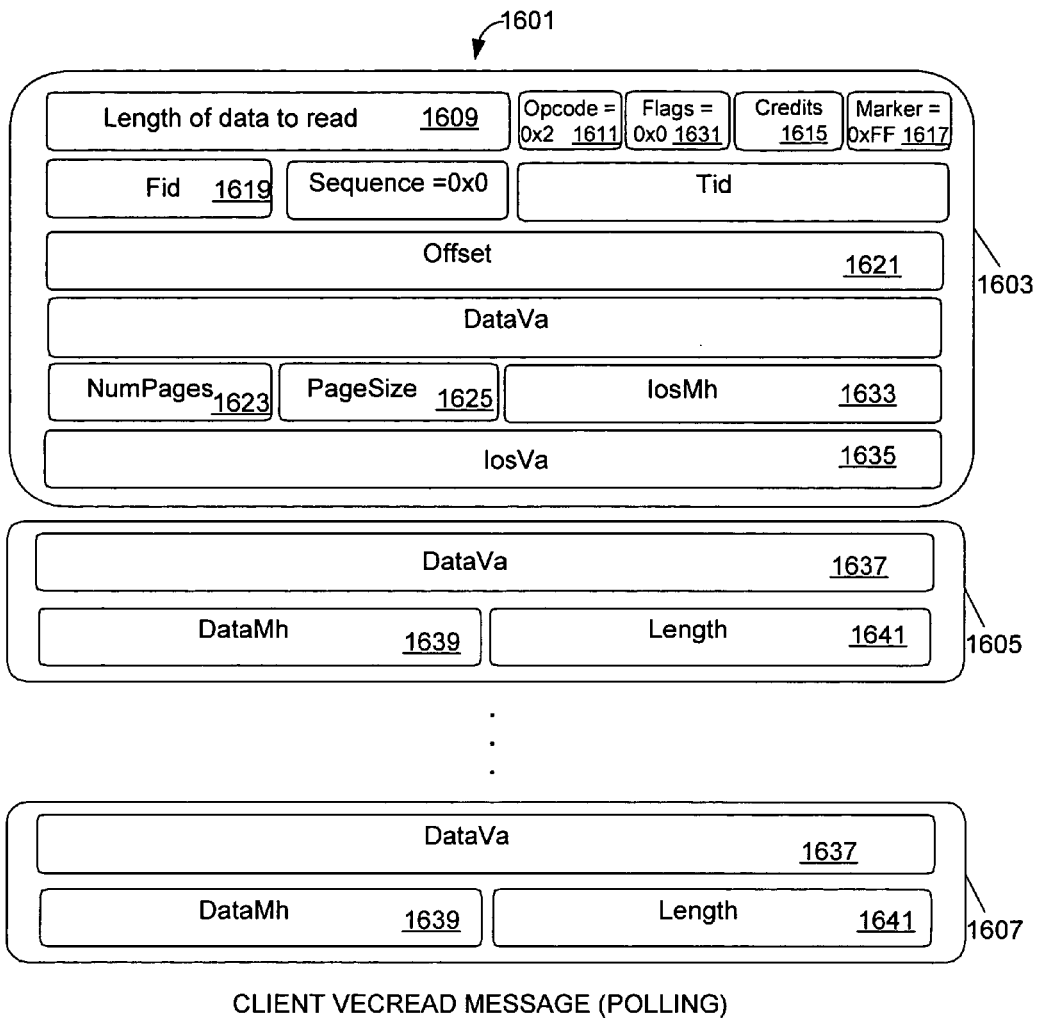
FIG. 16C is a diagram generally illustrating a representation of an exemplary client vectored read request message in the polling mode case, in accordance with an embodiment of the invention.

FIGS. 16A and 16C provide illustrative representations of the vectored read message sent by the client in an embodiment of the invention, with FIG. 16A giving the non-polling case and FIG. 16C giving the polling case. The read message 1401 comprises a common header 1603 followed by one or more LWIO_RDMA_REGION segments 1605, 1607. In the header 1603, Length 1609 is set to the number of bytes of data to be read from the file. Opcode 1611 is set to LWIO_OPCODE_VEC_READ (0x2). Offset 1621 is set to the byte location at which to begin reading the file data. Flags 1613, 1631 is set to 0x0 in the polling case 1631, or LWIO_HDR_FLAG_INTERRUPT (0x80) in the non-polling case 1613. Marker 1617 is set to 0xFF. Credits 1615 is set to the number of pending I/O requests on the client. Fid 1619 is set to the File Id on which to issue the I/O. NumPages 1623 is set to the number of LWIO_RDMA_REGIONs that follow the common header 1603. PageSize 1625 is set to the local page size in bytes.

In the non-polling case, ImmediateCookie 1627 and Cookie 1629 are set to client-specified values. The server can complete the vectored read request in this case with an LWIO_MSG_STATUS_RESPONSE by way of a normal send, or with an RDMA with immediate data if the read is successful. The immediate data of the RDMA write is accordingly set to the ImmediateCookie 1627 value of the read request. In the polling case, IosVa 1635 is set to the location at which the server response status (LWIO_IO_STATUS_BLOCK) is RDMAed, and IosMh 1633 is set to the associated memory handle.

The common header 1603 is immediately followed by a sufficient number of LWIO_RDMA_REGION segments 1605, 1607 to cover the length of the request. All intermediate segments must be one page in size. The final segment may be smaller than a page, but it must be a multiple of the backend disk sector size. In an embodiment of the invention, the LWIO_RDMA_REGION has the following format:

```
typedef volatile struct {
    PVOID64       DataVa;
    UINT32        DataMh;
    UINT32        Length;
} LWIO_RDMA_REGION;
```

The first LWIO_RDMA_REGION corresponds to the first PageSize bytes read, the second LWIO_RDMA_REGION corresponds to the second PageSize bytes read, and so on. DataVa 1637 is set to the location marking the beginning of the page in which the read data is to be placed. DataMh 1639 is set to the memory handle of the DataVa 1637. Length 1641 is set to the PageSize 1625 for all regions except for the final region, for which Length may be smaller but must be a multiple of the backend disk sector size.

In the non-polling case, the server first RDMAs the read data. The server then can respond with an LWIO_MSG_STATUS_RESPONSE, or the server can send immediate data with the RDMA read data, in which case the immediate data is set to the ImmediateCookie value of the read request. FIG. 16B provides an illustrative representation of the LWIO_MSG_STATUS_RESPONSE 1643 returned by the server in the non-polling case in an embodiment of the invention. Information 1647 is set to the number of bytes read. Status 1649 is set to 0, indicating success, or to another NTSTATUS, indicating failure. Cookie 1645 is set to the Cookie value set by the client in the header of the vectored read message.

Figure 16D:
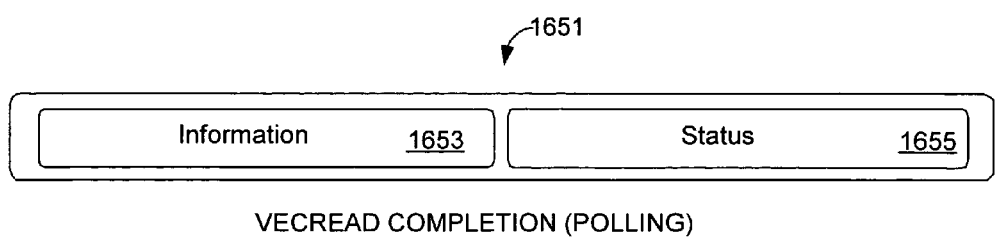
FIG. 16D is a diagram generally illustrating a representation of an exemplary server I/O status block completing a vectored read request in the polling mode case, in accordance with an embodiment of the invention.

In the polling case, first the server RDMAs the read data, and then the server RDMAs an LWIO_IO_STATUS_BLOCK. FIG. 16D provides an illustrative representation of the LWIO_IO_STATUS_BLOCK 1651 returned by the server in an embodiment of the invention. Information 1653 is set to the number of bytes read. Status 1655 is set to 0, indicating success, or another NTSTATUS, indicating failure.

Vectored Write

The vectored write message is used to perform a gather write into a particular Fid that was exchanged during the file registration. All write data is sent using ordinary send operations. The amount of data written is limited by the server MaxRecvBufferSize. If the client sends more data than this, the connection is terminated.

Figure 17A:
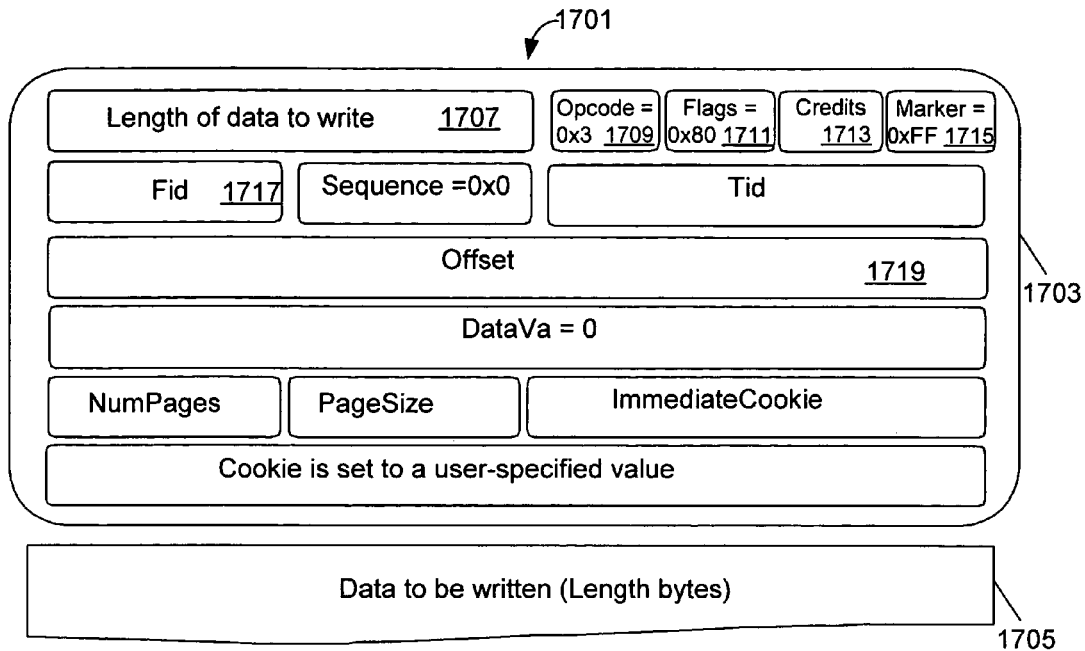
FIG. 17A is a diagram generally illustrating a representation of an exemplary client vectored write request message in the non-polling mode, non-collapsed case, in accordance with an embodiment of the invention.
Figure 17B:
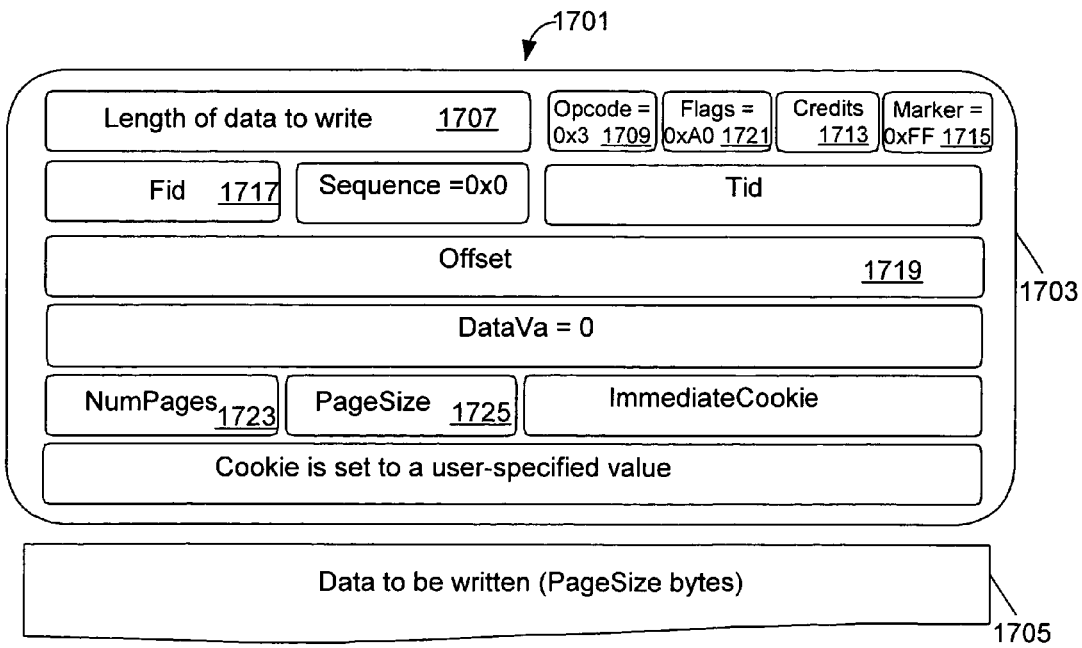
FIG. 17B is a diagram generally illustrating a representation of an exemplary client vectored write request message in the non-polling mode, collapsed case, in accordance with an embodiment of the invention.
Figure 17C:
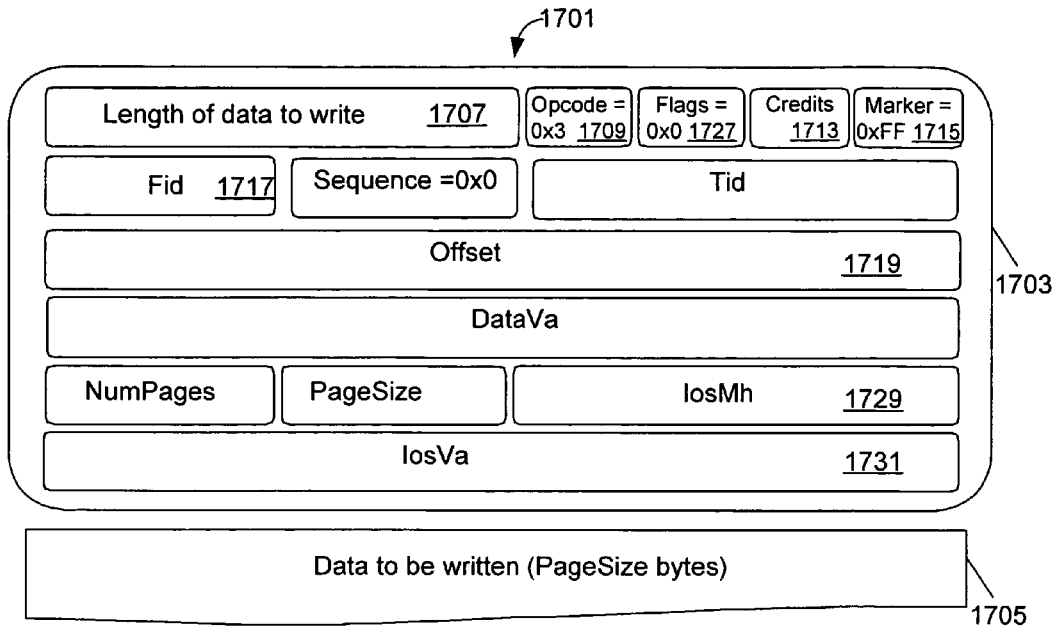
FIG. 17C is a diagram generally illustrating a representation of an exemplary client vectored write request message in the polling mode, collapsed case, in accordance with an embodiment of the invention.

FIGS. 17A, 17B and 17C provide illustrative representations of the vectored write message sent by the client in an embodiment of the invention, with FIG. 17A illustrating the non-polling, non-collapse case, FIG. 17B illustrating the non-polling, collapse case, and FIG. 17C illustrating the polling, collapse case.

The write message 1701 includes a common header 1703, immediately followed by the data to be written 1705. In the common header 1703, Length 1707 is set to the number of bytes of data being written. Opcode 1709 is set to LWIO_OPCODE_WRITE (0x3). Offset 1719 is set to the byte location at which to begin writing the file data. Marker 1715 is set to 0xFF. Credits 1713 is set to the number of pending I/O requests on the client. Fid 1717 is set to the File Id on which to issue the I/O.

Flags 1711, 1721, 1727 is set to 0x0, signifying polling 1727, or else to LWIO_HDR_FLAG_INTERRUPT (0x80) 1711. In the latter case, flags can also include LWIO_HDR_FLAG_COLLAPSE 1721 to indicate that all pages in the write contain the same data, so that only a single page of data has been sent. This is an optimization intended to minimize the transfer of redundant data. LWIO_HDR_FLAG_COLLAPSE can only be used if the registered file flags include FILE_NO_INTERMEDIATE_BUFFERING (0x8) and the PageSizes exchanged during the authentication stage are even multiples of each other. In the case of a collapsed I/O, NumPages 1723 is set to the number of pages of data spanned by the I/O. The last page may be partial due to the Length parameter. PageSize 1725 is set to the local page size in bytes. In the polling case, IosVa 1731 is set to the location at which the server response status (LWIO_IO_STATUS_BLOCK) is to be RDMAed. IosMh 1729 is the associated memory handle.

In the non-polling case, for both non-collapsed and collapsed I/O, the server responds to the write message with an LWIO_MSG_STATUS_RESPONSE.

Figure 17D:
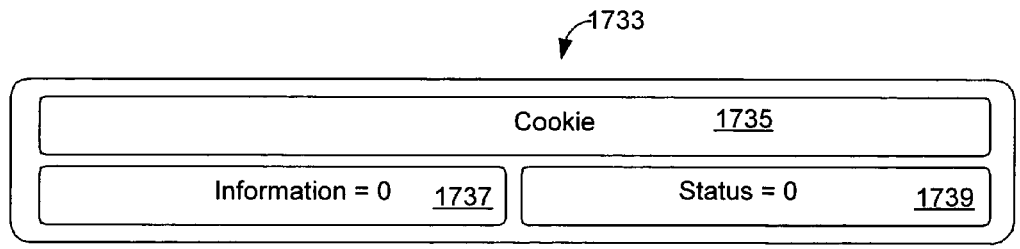
FIG. 17D is a diagram generally illustrating a representation of an exemplary server status response completing a vectored write request in the non-polling mode case, in accordance with an embodiment of the invention.

FIG. 17D provides an illustrative representation of the LWIO_MSG_STATUS_RESPONSE 1733 returned by the server in an embodiment of the invention. Information 1737 is set to the number of bytes written. Status 1739 is set to 0, indicating success, or to another NTSTATUS, indicating failure. Cookie 1735 is set to the Cookie value set by the client in the header of the write message.

Figure 17E:
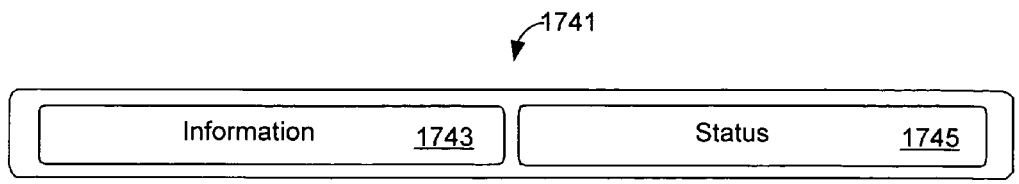

In the polling case, for both non-collapsed and collapsed I/O, the server RDMAs an LWIO_IO_STATUS_BLOCK. FIG. 17E provides an illustrative representation of the LWIO_IO_STATUS_BLOCK 1741 returned by the server in an embodiment of the invention. Information 1743 is set to the number of bytes written. Status 1745 is set to 0, indicating success, or to another NTSTATUS, indicating failure.

CONCLUSION

While illustrative embodiments of the invention have been illustrated and described, it will be appreciated that various changes can be made without departing from the invention. Similarly, any process steps described herein may be interchangeable with other steps in order to achieve the same result. In addition, the illustrative examples described above are not intended to be exhaustive or to limit the invention to the precise forms disclosed. On the contrary, the intention is to cover all modifications, alternative constructions, and equivalents falling within the spirit and scope of the invention.

What is claimed is:

1. A system for offloading an input/output (I/O) task from a first computer to a second computer, the system comprising:
a client running on the first computer;
a server running on the second computer; and
at least one remote direct memory access (RDMA) channel linking the first computer and the second computer, wherein the first computer and the second computer communicate in accordance with a protocol comprising:
a network discovery phase, wherein the network discovery phase is configured to:
create, by the client, an RDMA connection to the server over a shared RDMA-capable provider;
mutually authenticate, by the client and the server, the RDMA connection;
send, by the sewer, a credit request message indicating a buffer status of the server, the buffer status corresponding to an availability of the server to process the I/O requests that the client is attempting to offload to the server, wherein the credit request message comprises a first field of a plurality of fields, the first field comprising:
a negative value indicating a number of credits that the client has to give up when, based on the sewer availability, the sever cannot process any further I/O requests, and
a positive value indicating a number of the credits that the server has newly allocated for use by the client when, based on the server availability, the server can accept further I/O requests from the client, the credits corresponding to a number of I/O requests the client is attempting to offload to the server;
receive, by the client, the credit request message; and
in response to the client receiving the credit request message, send, from the client to the server:
a first indication, if the first field in the credit request message comprises the positive value, wherein the first indication notifies the server of at least one of the newly allocated credits that the client has used, and
at least one second indication, if the first field in the credit request message comprises the negative value, wherein each second indication corresponds to each credit that the client has released and wherein each second indication comprises a credit release value in an offset of a second field of a plurality of fields in each second indication, the credit release value being associated with a remaining amount of releasable credits by decrementing a magnitude of the negative value with each second indication, the offset of the second field being capable of conveying the credit release value in a 32 bit representation;
an I/O processing phase configured to process the I/O requests offloaded to the server, wherein read operations of the I/O phase are implemented using RDMA operations and write operations of the I/O phase are implemented using send operations, wherein the write operations are not implemented using the RDMA operations.

2. The system of claim 1 wherein the protocol is used in association with a second network protocol.

3. The system of claim 2 wherein the second protocol is a server message block (SMB).

4. The system of claim 2 wherein the second protocol is a common internet file system (CIFS).

5. A computer-readable medium storing computer-executable instructions and computer-readable data comprising a computer program product for use in a system for offloading an input/output (I/O) task from a first computer to a second computer, the system comprising:
at least one remote direct memory access (RDMA) channel linking the first computer and the second computer, wherein the first computer and the second computer communicate in accordance with a protocol comprising:
a network discovery phase, wherein the network discovery phase is configured to:
create, by the client, an RDMA connection to the server over a shared RDMA-capable provider;
mutually authenticate, by the client and the server, the RDMA connection;
send, by the server, a credit request message indicating a buffer status of the server, the buffer status corresponding to an availability of the server to process the I/O requests that the client is attempting to offload to the server, wherein the credit request message comprises a first field of a plurality of fields, the first field comprising:

a negative value indicating a number of credits that the client has to give up when, based on the server availability, the sever cannot process any further I/O requests, and a positive value indicating a number of the credits that the server has newly allocated for use by the client when, based on the server availability, the server can accept further I/O requests from the client, the credits corresponding to a number of I/O requests the client is attempting to offload to the server;

receive, by the client, the credit request message; and in response to the client receiving the credit request message, send, from the client to the server:

a first indication, if the first field in the credit request message comprises the positive value, wherein the first indication notifies the server of at least one of the newly allocated credits that the client has used, and at least one second indication, if the first field in the credit request message comprises the negative value, wherein each second indication corresponds to each credit that the client has released and wherein each second indication comprises a credit release value in an offset of a second field of a plurality of fields in each second indication, the credit release value being associated with a remaining amount of releasable credits by decrementing a magnitude of the negative value with each second indication, the offset of the second field being capable of conveying the credit release value in a 32 bit representation; and an I/O processing phase configured to process the I/O requests offloaded to the sewer, wherein read operations of the I/O phase are implemented using RDMA operations and write operations of the I/O phase are implemented using send operations, wherein the write operations are not implemented using the RDMA operations.

6. A method for offloading an input/output (I/O) task from a first computer to a second computer, the method comprising:

discovering, by a client on the first computer and a server on the second computer, at least one shared remote direct memory access (RDMA) capable provider, wherein discovering comprises:

creating, by the client, an RDMA connection to the sewer over the at least one shared RDMA-capable provider;

mutually authenticating, by the client and the server, the RDMA connection:

sending, by the server, a credit request message indicating a buffer status of the sewer, the buffer status corresponding to an availability of the sewer to process the I/O requests that the client is attempting to offload to the server, wherein the credit request message comprises a first field of a plurality of fields, the first field comprising:

a negative value indicating a number of credits that the client has to give up when, based on the sewer availability, the sever cannot process any farther I/O requests, and a positive value indicating a number of the credits that the server has newly allocated for use by the client when, based on the server availability, the server can accept further I/O requests from the client, the credits corresponding to a number of I/O requests the client is attempting to offload to the server;

receiving, by the client, the credit request message, in response to the client receiving the credit request message, sending, from the client to the server, one of the following:

a first indication, if the first field in the credit request message comprises the positive value, wherein the first indication notifies the server of at least one of the newly allocated credits that the client has used, and at least one second indication, if the first field in the credit request message comprises the negative value, wherein each second indication corresponds to each credit that the client has released and wherein each second indication comprises a credit release value in an offset of a second field of a plurality of fields in each second indication, the credit release value being associated with a remaining amount of releasable credits by decrementing a magnitude of the negative value with each second indication, the offset of the second field being capable of conveying the credit release value in a 32 bit representation; and posting, by the client, the I/O processing requests offloaded from the client for completion by the server on the second computer, wherein read operations are implemented using RDMA operations and write operations are implemented using send operations, wherein the write operations are not implemented using the RDMA operations.

7. The method of claim 6 wherein the discovering at least one shared RDMA-capable provider further comprises:

obtaining, by the client, a server request resume key from the server;

opening, by the client, a pipe to the server;

sending, by the client over the pipe, a negotiate request; and sending, by the server over the pipe, a negotiate response including a minimal list of common providers.

8. The method of claim 6, further comprising:

registering, by the client, one or more files for use with the server over the RDMA connection.

9. The method of claim 8 wherein the registering at least one file comprises:

sending, by the client to the server, a register file message; and sending, by the server to the client, a register file completion message.

10. The method of claim 6 wherein the authenticating the RDMA connection further comprises:

sending, by the client, an authenticate request message to the server, the authenticate request message including a key;

if the key matches a previous key sent by the server to the client, sending, by the server, an authenticate response message to the client.

11. The method of claim 10 wherein the previous key is a key contained in a negotiate response message sent by the server to the client.

12. The method of claim 10, further comprising:

sending, by the server to the client, a status response message to complete the authenticating.

13. The method of claim 6 wherein the posting the I/O processing request comprises sending, by the client, one of (a) a close request, (b) a cancel request, (c) a read request, (d) a write request, (e) a vectored read request, and (f) a vectored write request.

14. The method of claim 13, further comprising:
completing, by the server, the read request and the vectored read request by sending data using RDMA write operations; and
completing, by the server, the write request and the vectored write request by sending data using normal send operations.

15. The method of claim 13 wherein the vectored write request includes a collapse flag in a header of the request.

16. The method of claim 6 wherein posting the I/O processing request further includes indicating whether the completion by the server should be in polling mode.

17. The method of claim 16 wherein the indicating whether the completion should be in polling mode comprises indicating that the completion should not be in polling mode by setting an interrupt flag in a header of the I/O processing request.

18. The method of claim 16, further comprising: if the client indicates that
the completion should not be in polling mode, completing, by the server, the I/O processing request by sending a status block to the first computer by way of RDMA transfer.

19. The method of claim 16, further comprising: if the client indicates that the completion should be in polling mode, and the client has sent an interrupt request message to the server, sending, by the server to the client, an interrupt response message by way of an ordinary send.

20. The method of claim 6 wherein posting the I/O processing request further includes specifying a number of credits in a header of the request.

21. A computer-readable media storing computer-executable instructions for implementing a method for offloading an input/output (I/O) task from a first computer to a second computer, the method executed by the computer-executable instructions comprising:
discovering, by a client on the first computer and a server on the second computer, at least one shared remote direct memory access (RDMA) capable provider;
requesting, by the first computer, a sewer request resume key;
passing, by the second computer, the server request resume key as an authentication mechanism, wherein requesting and passing the request resume key comprises:
creating, by the client, an RDMA connection to the sewer over the at least one shared RDMA-capable provider;
mutually authenticating, by the client and the server, the RDMA connection;
sending, by the server, a credit request message indicating a buffer status of the sewer, the buffer status corresponding to an availability of the sewer to process the I/O requests that the client is attempting to offload to the server, wherein the credit request message comprises a first field of a plurality of fields, the first field comprising:
a negative value indicating a number of credits that the client has to give up when, based on the server availability, the sever cannot process any further I/O requests, and
a positive value indicating a number of the credits that the server has newly allocated for use by the client when, based on the server availability, the server can accept further I/O requests from the client, the credits corresponding to a number of I/O requests the client is attempting to offload to the server;
receiving, by the client, the credit request message,
in response to the client receiving the credit request message, sending, from the client to the server, one of the following:
a first indication, if the first field in the credit request message comprises the positive value, wherein the first indication notifies the server of at least one of the newly allocated credits that the client has used, and
at least one second indication, if the first field in the credit request message comprises the negative value, wherein each second indication corresponds to each credit that the client has released and wherein each second indication comprises a credit release value in an offset of a second field of a plurality of fields in each second indication, the credit release value being associated with a remaining amount of releasable credits by decrementing a magnitude of the negative value with each second indication, the offset of the second field being capable of conveying the credit release value in a 32 bit representation; and
posting, by the client, the I/O processing requests offloaded from the client for completion by the server on the second computer, wherein read operations are implemented using RDMA operations and write operations are implemented using send operations, wherein the write operations are not implemented using the RDMA operations.

* * * * *

UNITED STATES PATENT AND TRADEMARK OFFICE
CERTIFICATE OF CORRECTION

| | | |
|---|---|---|
| PATENT NO. | : 7,698,361 B2 | |
| APPLICATION NO. | : 10/749959 | |
| DATED | : April 13, 2010 | |
| INVENTOR(S) | : Ahmed H. Mohamed et al. | |

It is certified that error appears in the above-identified patent and that said Letters Patent is hereby corrected as shown below:

In column 19, line 61, in Claim 1, delete "sewer," and insert -- server, --, therefor.

In column 20, line 2, in Claim 1, delete "sewer" and insert -- server --, therefor.

In column 20, line 41, in Claim 2, delete "a second" and insert -- another --, therefor.

In column 20, line 42, in Claim 3, delete "second" and insert -- other --, therefor.

In column 20, line 44, in Claim 4, delete "second" and insert -- other --, therefor.

In column 21, line 35, in Claim 5, delete "sewer," and insert -- server, --, therefor.

In column 21, line 49, in Claim 6, delete "sewer" and insert -- server --, therefor.

In column 21, line 54, in Claim 6, delete "sewer," and insert -- server, --, therefor.

In column 21, line 55, in Claim 6, delete "sewer" and insert -- server --, therefor.

In column 21, line 61, in Claim 6, delete "sewer" and insert -- server --, therefor.

In column 21, line 62, in Claim 6, delete "farther" and insert -- further --, therefor.

In column 22, line 40, in Claim 8, delete "one or more files" and insert -- at least one file --, therefor.

In column 22, line 49, in Claim 10, delete "claim 6" and insert -- claim 6, --, therefor.

In column 22, line 57, in Claim 11, after "wherein" insert -- sending, by the server, the authenticate response message to the client comprises sending, by the server, the authenticate response message when --.

Signed and Sealed this
Twenty-fifth Day of January, 2011

David J. Kappos
*Director of the United States Patent and Trademark Office*

CERTIFICATE OF CORRECTION (continued)
U.S. Pat. No. 7,698,361 B2

In column 23, line 6, in Claim 14, delete "normal" and insert -- the --, therefor.

In column 23, line 8, in Claim 15, after "wherein" insert -- posting the I/O processing request comprises sending, by the client, --.

In column 23, line 9, in Claim 15, delete "includes" and insert --, the vectored write request including--, therefor.

In column 23, line 40, in Claim 21, delete "sewer" and insert -- server --, therefor.

In column 23, line 46, in Claim 21, delete "sewer" and insert -- server --, therefor.

In column 24, line 2, in Claim 21, delete "sewer," and insert -- server, --, therefor.

In column 24, line 3, in Claim 21, delete "sewer" and insert -- server --, therefor.